(12) United States Patent
    Samid

(10) Patent No.: US 11,917,047 B1
(45) Date of Patent: Feb. 27, 2024

(54) CRYPTOGRAPHIC MULTI-DIMENSIONAL ELUSIVE KEY: RANDOMIZED SIZE, SHAPE, AND CONTENT

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 18/227,694

(22) Filed: Jul. 28, 2023

Related U.S. Application Data

(63) Continuation-in-part of application No. 18/088,718, filed on Dec. 26, 2022, now Pat. No. 11,716,192.

(60) Provisional application No. 63/521,825, filed on Jun. 19, 2023, provisional application No. 63/467,624, filed on May 19, 2023.

(51) Int. Cl.
    *H04L 9/06* (2006.01)
    *H04L 9/16* (2006.01)

(52) U.S. Cl.
    CPC .............. *H04L 9/0618* (2013.01); *H04L 9/16* (2013.01)

(58) Field of Classification Search
    CPC ....................................... H04L 9/0618
    See application file for complete search history.

(56) References Cited

U.S. PATENT DOCUMENTS 4,195,196 A  *  3/1980   Feistel ..................... H04L 9/065
                                                            380/265
    5,974,144 A  *  10/1999  Brandman ............ H04L 9/0841
                                                            380/37
    2002/0150240 A1* 10/2002 Henson ................. H04L 9/0618
                                                            380/44
    2019/0386963 A1* 12/2019 Shi ...................... H04L 63/0435

* cited by examiner

*Primary Examiner* — Bradley W Holder

(57) ABSTRACT

A system and a method to build a recovery capability for a compromised network based on user controlled ad-hoc randomness combined with simplicity; immunized against stealth cryptanalysis which overshadows the prevailing security solutions.

13 Claims, 20 Drawing Sheets

Fig 1 EK Architecture
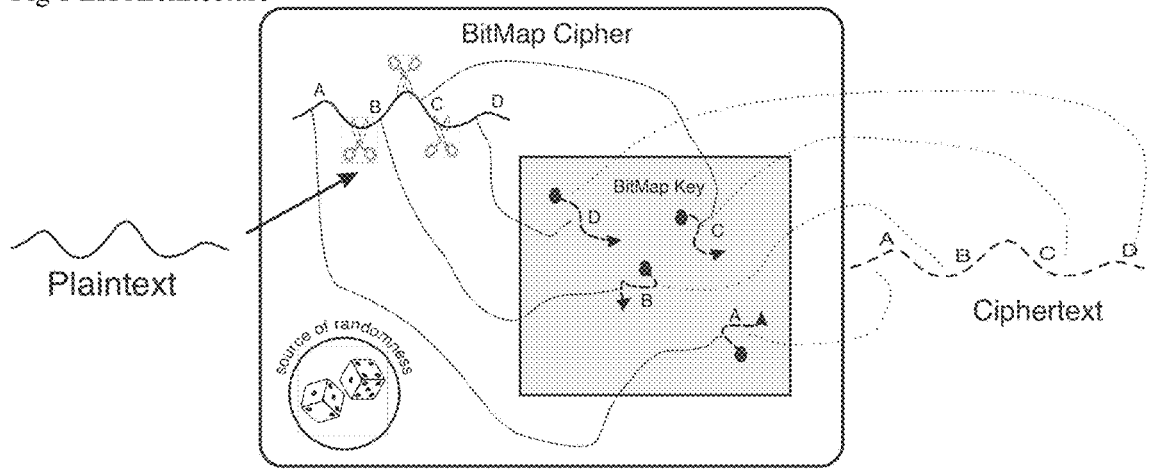
Randomness chops the plaintext, randomness posts the chopped sections on randomized locations, randomness determines how much dilution to apply. No pattern, only randomness.
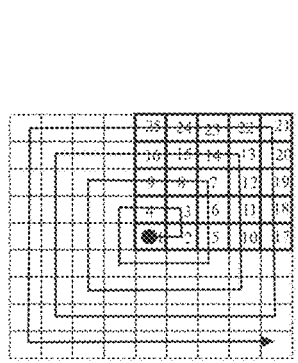
Snail Sequencing over Scaffolding (2)
Fig 2: Key "Snail" Sequencing
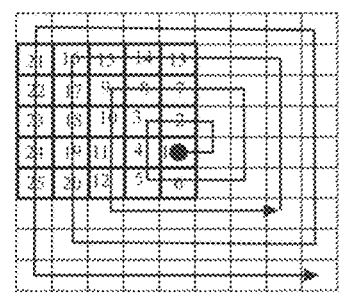
Snail Sequencing over Scaffolding
Fig 3
Dilution
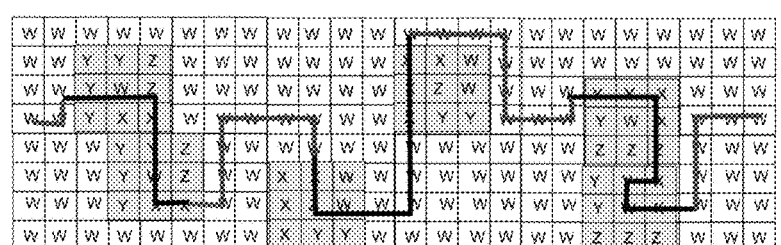

Fig 4

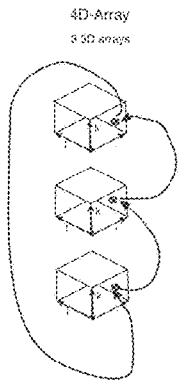

4D-Array
3 3D arrays

Fig 5

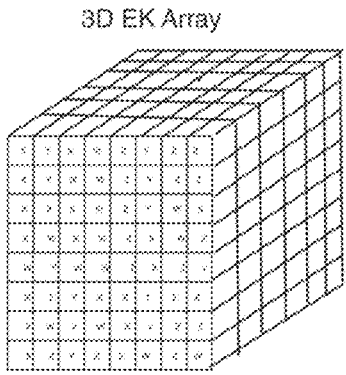

3D EK Array

Fig 6

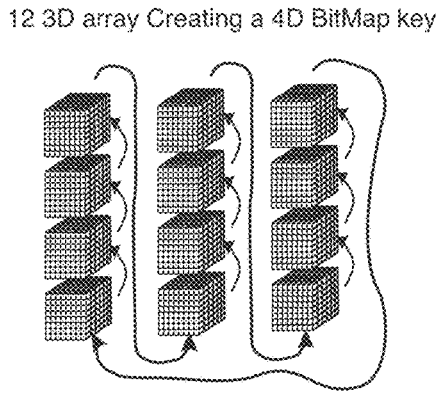

12 3D array Creating a 4D BitMap key

Fig 7

Eight Neighbors 2D BitMap

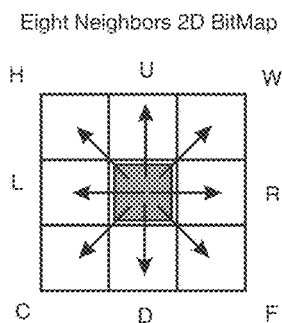

Fig 8

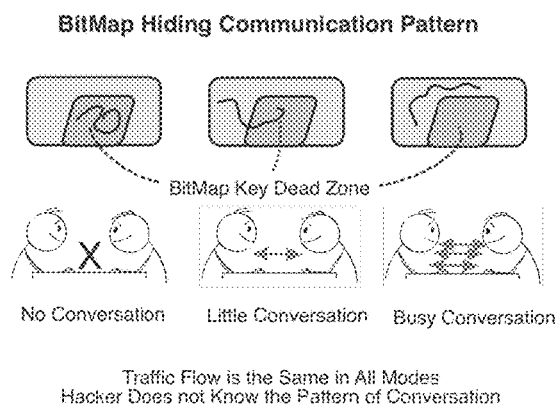

BitMap Hiding Communication Pattern

BitMap Key Dead Zone

No Conversation   Little Conversation   Busy Conversation

Traffic Flow is the Same in All Modes
Hacker Does not Know the Pattern of Conversation

Fig 9

Rock of Randomness Verifying Cipher' Structural Integrity

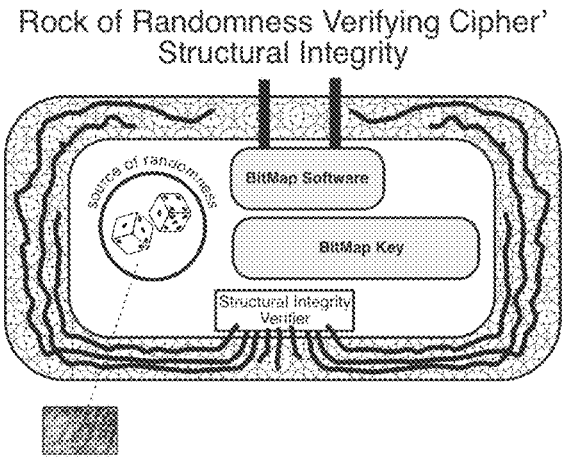

Fig 10

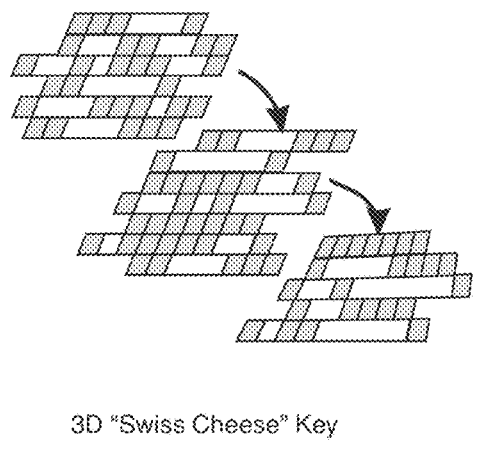

3D "Swiss Cheese" Key

Fig 11                  Virtual Arrows
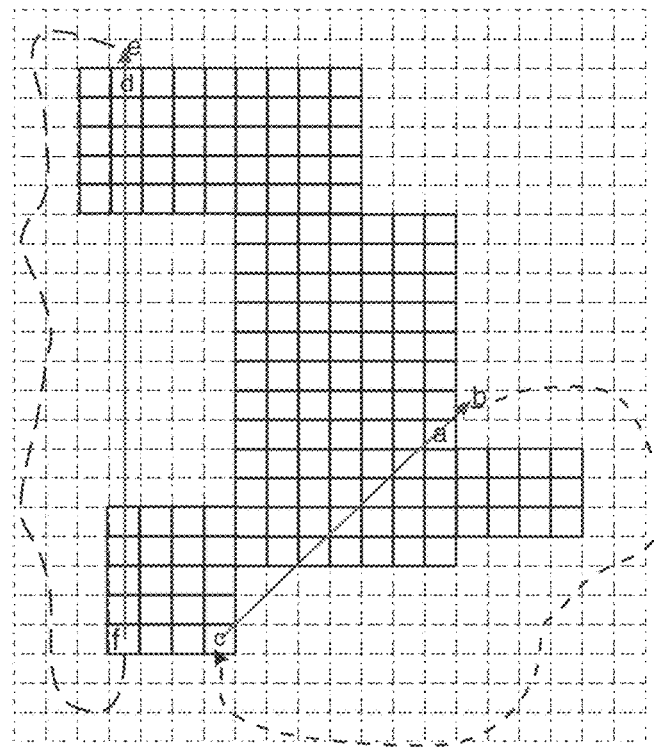
Fig 12
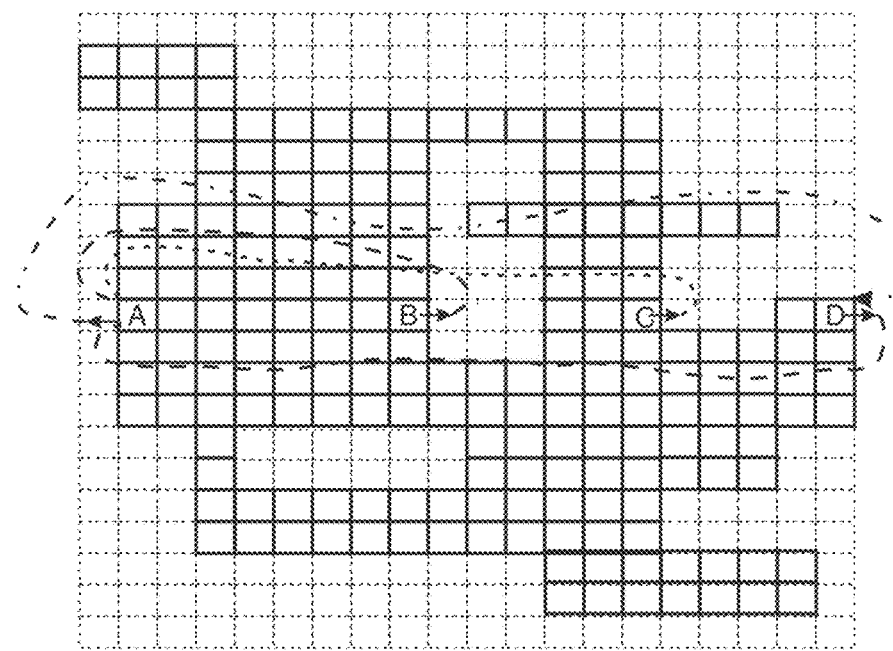
Virtual Edges Asymmetry 3D Rugged Edge Key with Holes Subjective Order of the Vertices (1)

46 Vertices 2D Key

Counting 10 'W' from Vertex 18

Mapping travel guide:

W X Y W Y X  Z X W X W X

On the Elusive key

Fig 14 Encryption Illustration (Walk)

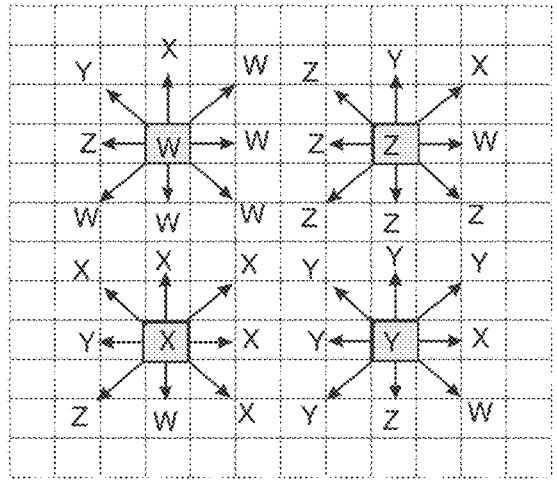
4 Veritces Compliant Key
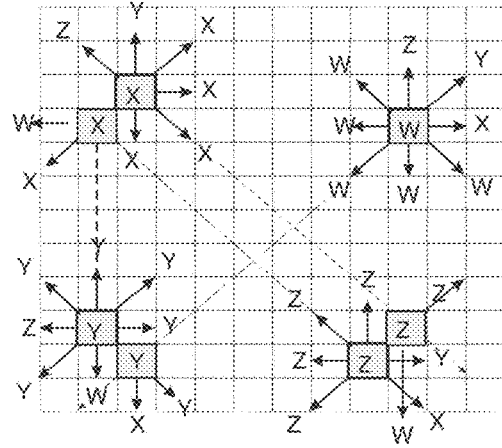
Seven Compliant Vertices
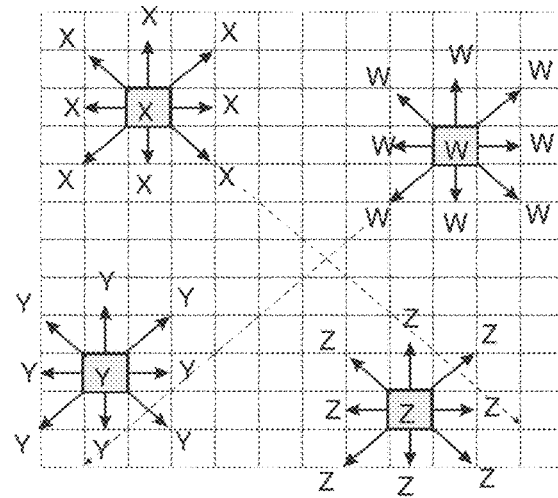
Non-Connecting 2D vertices
Fig 15: Sparse key illustration Fig 16
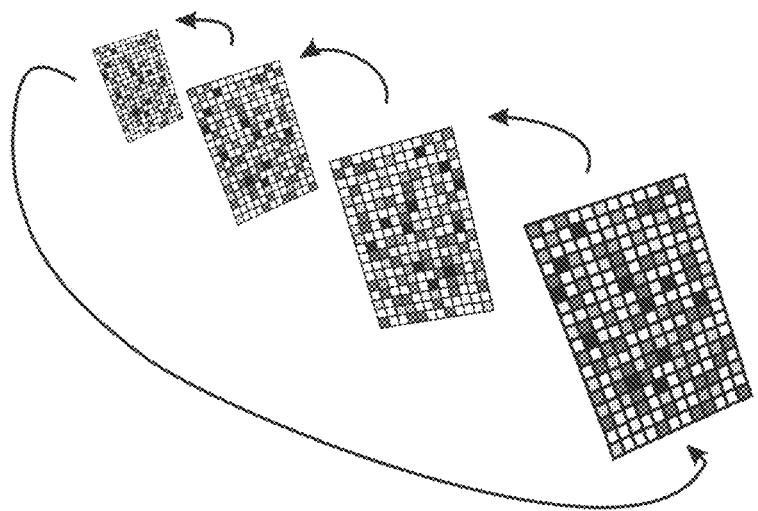
3D Rock constructed from 2D Rocks
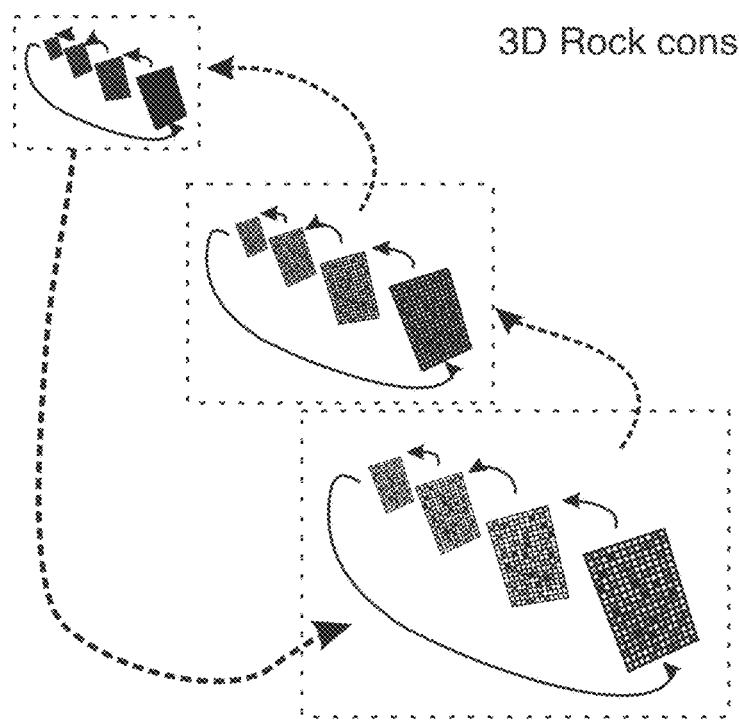
4D Key Constructed from Sequences 3D Keys
Fig 17

Fig 18: Color Rock
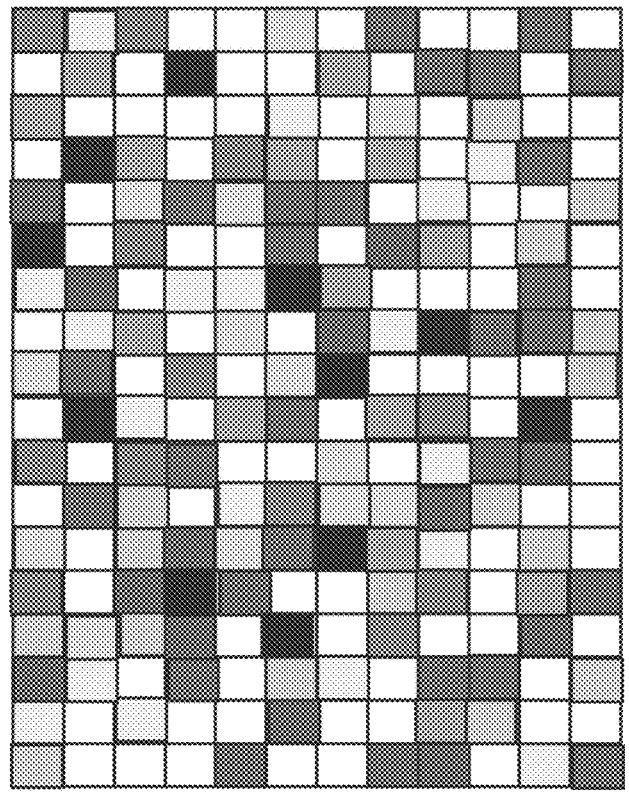
2D 8 Letters Rock
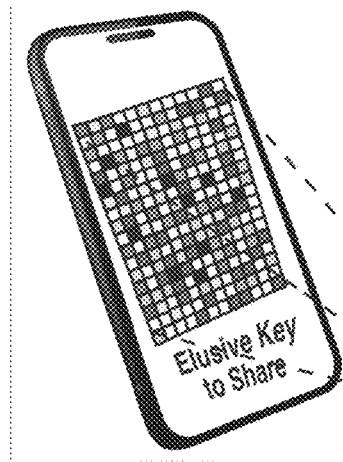
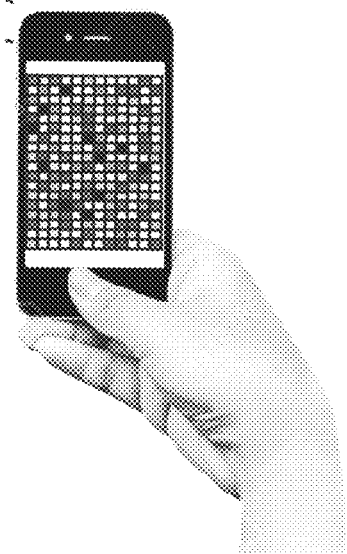
Elusive key
Generated in One
Phone, copied to
Another Phone One Sided Conductivity Measuring Double Layer Rock Multi Layer Conductivity Rock Fig.-23
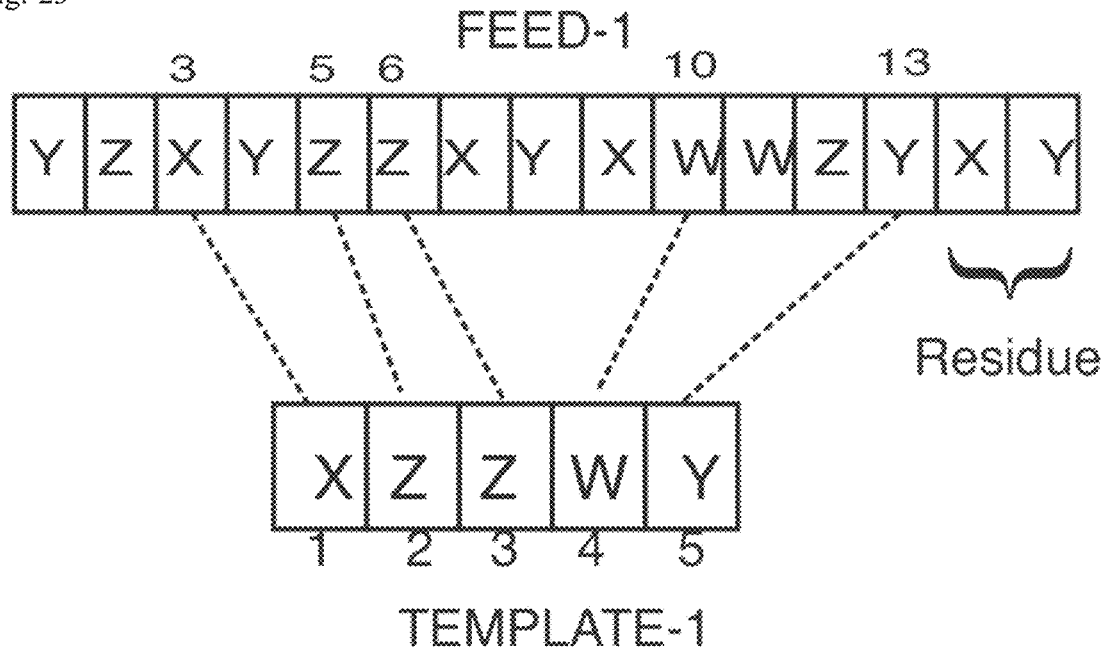
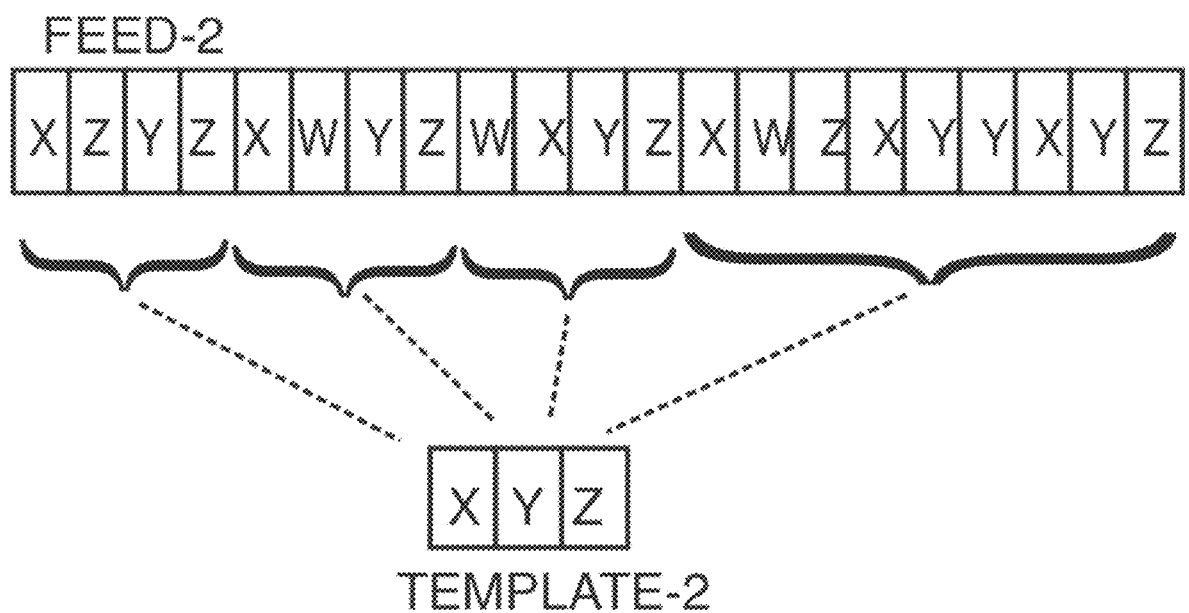
Replica Illustrations Elusive Key – Manuel Fig 26 The Snail Sequence

2D Array Subjective Listing

Fig-31 Illustration:
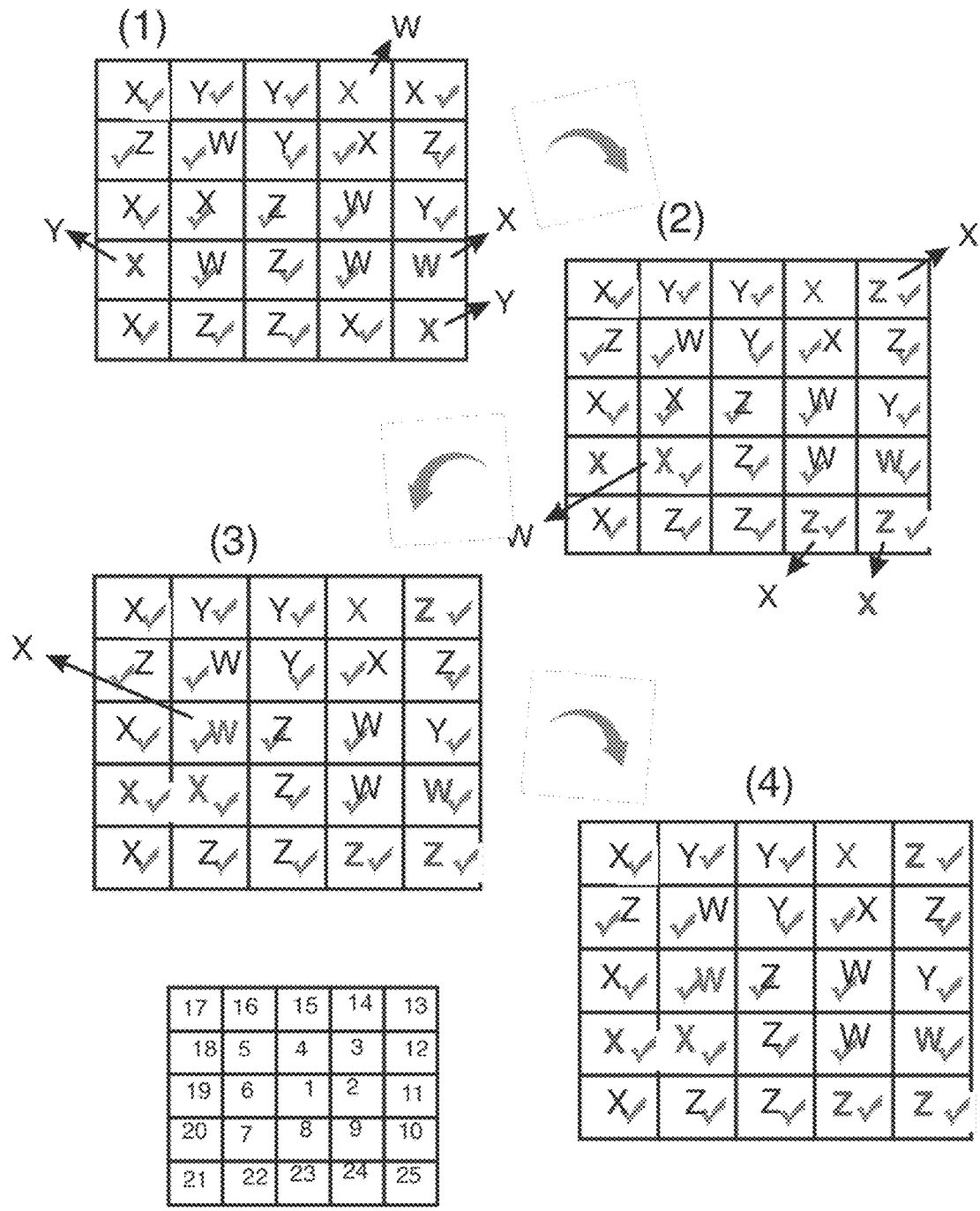

CRYPTOGRAPHIC MULTI-DIMENSIONAL ELUSIVE KEY: RANDOMIZED SIZE, SHAPE, AND CONTENT

This application is also a continuation in part of U.S. patent application Ser. No. 17/744,777 filed May 16, 2022. This application is also a continuation in part of U.S. patent application Ser. No. 17/510,324 filed Oct. 25, 2021, and it is also a continuation in part of U.S. patent application Ser. No. 17/216,274 filed Mar. 29, 2021, and also continuation in parts of U.S. application Ser. No. 17/001,163 filed 2020 Aug. 24, and also a continuation in part of U.S. patent application Ser. No. 16/855,517 filed Apr. 22, 2020, which is a continuation of application Ser. No. 16/687,690, which is a continuation of application Ser. No. 16/444,892.

THIS DEFINES A CONTINUATION ZONE ENCOMPASSING THE CURRENT APPLICATION AND application Ser. Nos. 17/744,771, 17/510,324, 17/216,274, 17/001, 163, 16/855,517, 16/687,690, 16/444,892, AND ALL THE PROVISIONAL APPLICATIONS REFERENCED IN THE CONTINUED APPLICATIONs Specifically, this application claims the priority of the following provisional applications: Provisional Application No. 62/688,387 filed on Jun. 22, 2018; Provisional Application No. 62/689,890 filed on Jun. 26, 2018; Provisional Application #62714735 filed on Aug. 5, 2018; Provisional Application No. 62/782,301 filed on Dec. 19, 2018; Provisional Applications No. 62/805, 369 filed on Feb. 14, 2019; Provisional Application No. 62/813,281 filed on Mar. 4, 2019; Provisional Application No. 62/782,301 filed on Dec. 19, 2018; Provisional Application No. 62/813,281 filed 4 of Mar. 2019; Provisional Application No. 62/850,720, filed May 21, 2019; Provisional Application No. 62/857,898 filed 6 Jun. 2019; Provisional application 63/140,006 filed 2021 Jan. 21; 63/30, 6501 filed 2022 Feb. 4, no. 63/292,954 filed 2021 Dec. 22, no. 63/276,662, 2021 Nov. 8 and 63/30,6501 filed 2022 Feb. 4.

This application also claims the priority of the following provisional applications: No. 63/467,624 filed 2023 May 19; 63/52,1825 filed 2023 Jun. 19.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Public facing networks are vulnerable to persistent hackers, and one must account for occasional breaches. It is important to be prepared with a breach recovery plan, which needs to be based on a hard core for which one has the most robust assurances of resilience and serviceability when needed. Such assurance can only be based on a security system that is immunized to stealth cryptanalysis which overshadows the prevailing solutions.

BRIEF SUMMARY OF THE INVENTION

This Invention upgrades the network skeleton security established in the continued application, by building a cryptographic solution which shifts security responsibility from the cipher designer to the cipher user. This is done on the basis of the principle that states: randomness with complexity exposes vulnerability, but randomness with simplicity exhibits security. Replacing fixed mathematical complexity with open ended randomness controlled by the message transmitter. Security starts with a "Rock"—a physical or a virtual multi dimensional structure of secret size, secret shape and secret content. The "Rock" carries the plaintext letters, and the transmitter guides the recipient to read them in the order of the encrypted message by sending reading instructions that are created by transmitter-unilateral randomness, and require possession of the Rock for evaluation. This Rock serves as an "elusive key" that cannot be brute force extracted without lingering doubt as to the actual key being different, and in particular larger. No arbitrary security parameters are used—all choices are randomized and thereby no pattern is showing up in the ciphertext—no pattern to hack. The Rock can be implemented as guarded box serving a large network, specially fitted for network recovery because of the hacking resilience of the key; It can also be implemented as colorful surface shared phone to phone via the camera. The very same Rock can interpret a given ciphertext in more ways than one—depending on the shared plaintext language. When it comes to public-facing networks, a network breach is always a possibility and hence a quick reliable recovery option as provided by the Elusive key (the Rock) is not just advisable, it is a survival must.

BRIEF DESCRIPTION OF THE SEVERAL VIEWS OF THE DRAWING

FIG. 1: EK Architecture This figure shows the Walk method of the Elusive key: a plaintext is fed into the cipher where it is chopped arbitrarily or randomly to slices. Each slice is pegged on a different secret location on the key where it begins a path dictated by the contents of the plaintext letters in that plaintext segment. That path is then expressed in ciphertext language. The ciphertext slices are pieced together to a full ciphertext representing the input plaintext. Decryption happens in reverse. The figure shows four slices: A, B, C and D. The figure also indicates that the cipher is serviced by a randomness source that determines the slicing, the placing of the slices, and the exact pathway on the key of each slice.

FIG. 2 Key "Snail" Sequencing This figure illustrates how the vertices (bins) of the elusive key are sequenced using the 'snail' procedure. In the middle of the figure we see a 5*5 key where the sequencing begins with the center bin (marked 1). The snail procedures rolls about that first bin and thereby lists by order all the 25 bins (vertices) of the key. This is shown both by index numbers and by a snail like arrow, next to the numbers. On the right, the snail procedure is applied to side vertex. The arrow shows the snail sequence. The snail is drawn over the scaffolding in which the key is positioned. As the snail track is hitting a key vertex it assigns it the next index number. The result again is that all 25 vertices are marked by order 1-25, but a completely different order. On the left the snail tracking procedure is applied to a corner vertex of the key. The figure shows the snail path over the scaffolding and the marked vertices (bins) of the key as they are encountered by the evolving snail track.

FIG. 3 Dilution This figure shows an elusive key comprised of "islands" of letters clamps surrounded by an "ocean" of same letter "W". It shows a plaintext path comprised of black sections corresponding to actual message elements and of red sections comprised of pathways over the same letter. These pathway appear normal at the ciphertext level, but to anyone holding the key these 'same letter' sections are decoys—correspond to no plaintext.

FIG. 4 4D Array: 3 3D array The figure shows 3 3D keys, each marked with a red dot indicating similar location of a vertex (bin) in the 3D package. Arrows indicate the cyclical steps leading from one red dot (one vertex) in one 3D pack to the same vertex in the next 3D pack. Thereby these 3 3D packs form a 4D key.

FIG. 5: 3D EK array Illustration of a 3D elusive key marked with a 4 letters plaintext alphabet X, Y, Z, and W.

FIG. 6 12 3D array creating a 4D map key 12 3D keys are being strung in a cyclical way to form a 4D elusive key.

FIG. 7: Eight neighbors 2D BitMap This figure shows the 8 possible steps to be taken from any given 2D bin (vertex) in marking a plaintext guided pathway on the elusive key.

FIG. 8 BitMap Hiding Communication Pattern The figure shows an elusive key comprised of a grey area (the 'walk' option) where movement is through the same key, so no new message material is carried by that path section, and is also comprised of a green area where movement involves changing keys—message content. The figure shows on the right two communicators speaking to each other with no sections of no speech, no randomized bits. In the middle section it shows communication involving content passing and decoy passing (no communication passing). The left side of the figure shows two communicators not saying anything to each other. The path on the key that represents their conversation is wholly on the grey are (passing through bins containing the same letter).

FIG. 9: Rock of Randomness Verifying Cipher's Structural Integrity The figure shows an enclosure secure with the Rock of Randomness technology, containing Elusive Key (BitMap) software, BitMap key and a source of randomness. The apparatus will encrypt and decrypt messages, but will self-destruct if it detects any attempt to tamper with its enclosure.

FIG. 10 3D "Swiss Cheese" key The figure shows three layers of 2D keys overlaid on top of each other. Each layers has 'holes' (empty bins) in different locations, creating a 3D "Swiss Cheese" elusive key.

FIG. 11 Virtual Arrows This figure demonstrates the definition of virtual arrows. It shows bin marked 'a' where the edge pointing to north-east, points to an empty bin, and therefore one draws a line in the opposite direction (a diagonal line, as it happens)—direction south-west (SW). The line meets bin "c" as the furthest bin on the key along that lone. Hence the edge in direction NE pointing from bin "a" is pointing to bin "c". The figure also shows a bin marked "d" for which the edge pointing north, points to an empty bin, and hence one draws a line in the opposite direction (south, S). That line meets bin "f" as the furthest on that line. Mind you that the line passes through several empty bins, which is OK, the criteria for pointing to f is f being the furthest nonempty bin along that line drawn from bin 'd'. It is easy to see that the edge pointing south-west from bin "c" points to bin "a", and the edge pointing south from bin f, points to bin d.

Note: in this figure and in FIGS. 12, 13, 14, and 15 the 'scaffolding' is shown with broken lines, and the key itself (nonempty bins) is shown with bold lines.

FIG. 12 Virtual Edges Asymmetry This figure demonstrates asymmetry with regard to virtual arrows. Bin A, has an edge in the West direction that points to an empty bin, so the line in the opposite direction points to bin "D" as the furthest, so D is the result of going west from A. This relation is symmetric because D points to A since D points to an empty bin in direction East. However bins "B" and "C" also point to bin "A" and "A" does not point back to them—asymmetry.

Figure 13:
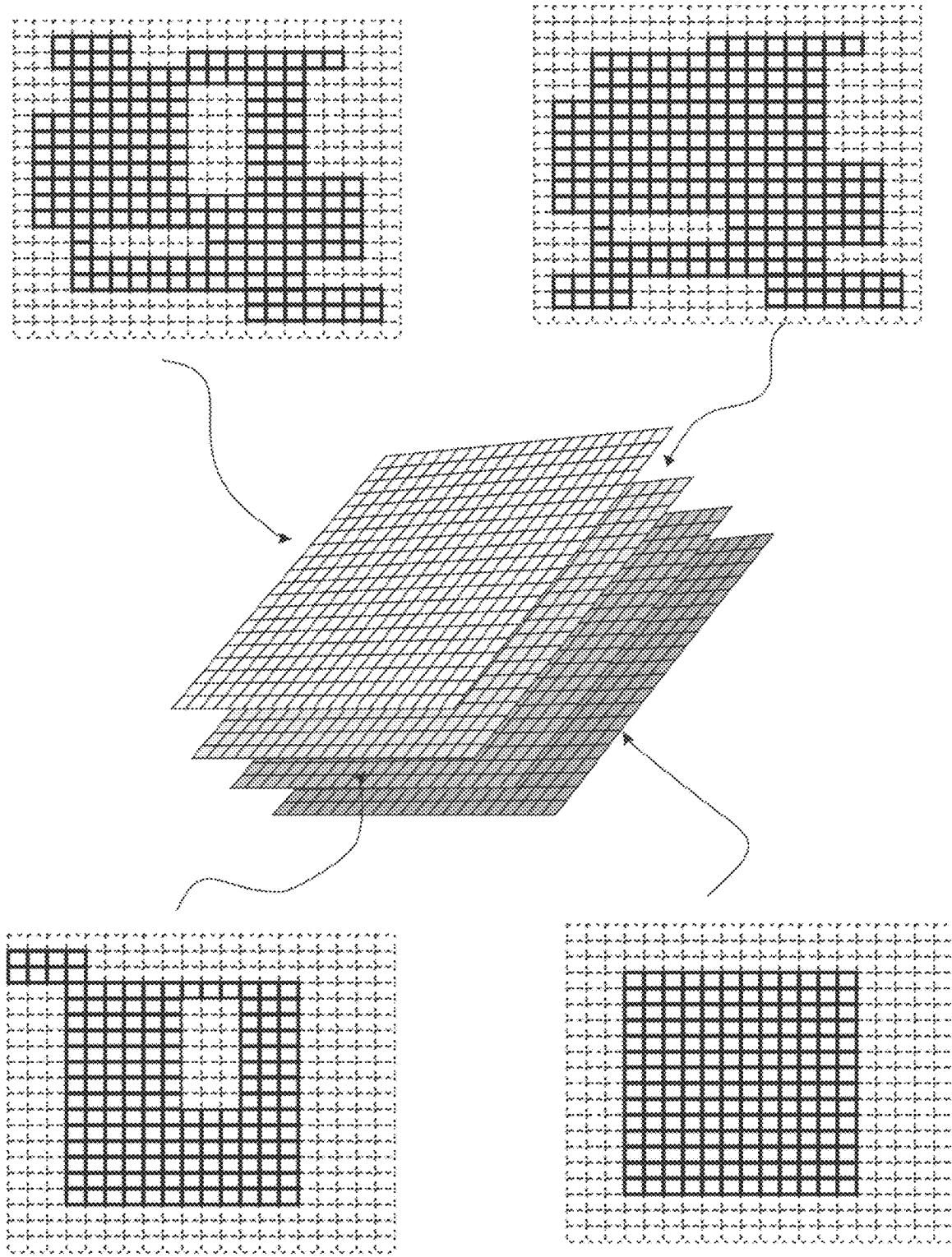

FIG. 13 3D Rugged Edge Key with Holes This is another example of 2D keys with unmatched "holes" that are combined into a 3D elusive key.

FIG. 14 Encryption Illustration ("Walk") This figure illustrate a "walk" encryption. Part (1) (top left) shows a 46 bins elusive key that is snail sequenced based an arbitrary selection of bin #1, from which the "snail" path is drawn, and all bins are marked in their subjective order. Next to it (top right) the same key is randomized, namely marked with letters of the plaintext alphabet (4 letters X, Y, Z, W). The transmitter, sends to the recipient the identity of bin 1 in the subjective order, and instructs the recipient to proceed along the snail sequence and count 10 occasions where the letter in bin 1 has appeared. The bin that contains this letter for the $10^{th}$ time is the bin from which the Walk travel path starts. The recipient is marking the sequence of the key from bin 1, as marked in the snail like arrow. Bin 18 in the count happens to be the bin where the letter W (which is the letter of bin 1) appears along the key sequence in the 10th time (it appears before in bins 1, 2, 3, 5, 12, 13, 14, 16, 17). So bin 18 is from where the transmitter started to mark the pathway defined by the plaintext message which happens to be WXYWYX ZXWXWX. The path is shown at the bottom right. It is expressed as ciphertext using the edge directions. Starting from bin 18:

[ciphertext]=SW, S, E, SW (virtual), S, S W, SE, N, N, N NW, W, W, S, W, N, SE, S, S, S, S, NW The recipient draws the ciphertext starting at bin 18, and writes down the corresponding bins:

[plaintext]
WXYWYXXZXXXXWWVWWWWWWXWWW
WX removing duplications:
[plaintext]=WXYWYX ZXWXWXX To extract the plaintext version that drew the travel path. Next the recipient will remove all the W letters that were put there to eliminate duplications, yielding: plaintext: XYYX ZXXX FIG. 15 Sparse Key Illustration This figure illustrates a sparse elusive key. On the left top one observes the smallest possible key for a plaintext comprising 4 letters: X, Y, Z, W. It is comprised of only 4 bins, where all the edges are in virtual mode, and from every bin there is a direct connection to all the remaining 3 letters. The section a bit lower and to the right shows an elusive key comprising 7 bins, which are clearly compliant. The bottom part of the figure shows 4 bins that are so aligned that from no letter is there a path to any of the other three letters, so it is very non-compliant with the travel continuity requirement.

FIG. 16 3D Rock constructed from 2D Rocks This figure shows 4 plates of 2D keys identified by several colors, and arrows show how the plates are aligned and counted cyclically.

FIG. 17 4D Key Constructed from Sequences 3D keys The figure shows 3 sets of 3D keys, each comprised of 4 2D keys, and how these 3 3D sets are aligned for cyclic counting.

FIG. 18 Color Rock This figure shows an elusive key marked with 8 letters, identified each with a unique color. The key is inundated with empty bins (marked white). The letter marking is randomized. The bottom of the figure shows one telephone showing such a colorful 2D key on its screen, while the next phone is reading that key through it camera.

Figure 19:
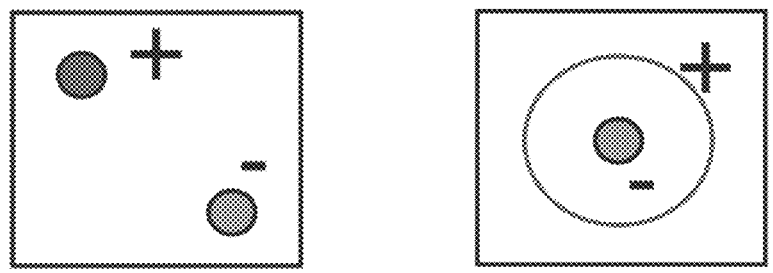

FIG. 19 One Sided Conductivity measuring This figure shows measuring arrangement for conductivity of material inside a bin that is part of the Rock. One arrangement calls for measuring between two diverging points on the surface of the bin, and the other arrangement calls for conductivity to be measured between a circular pole and a middle point on the surface of the measured bin.

Figure 20:
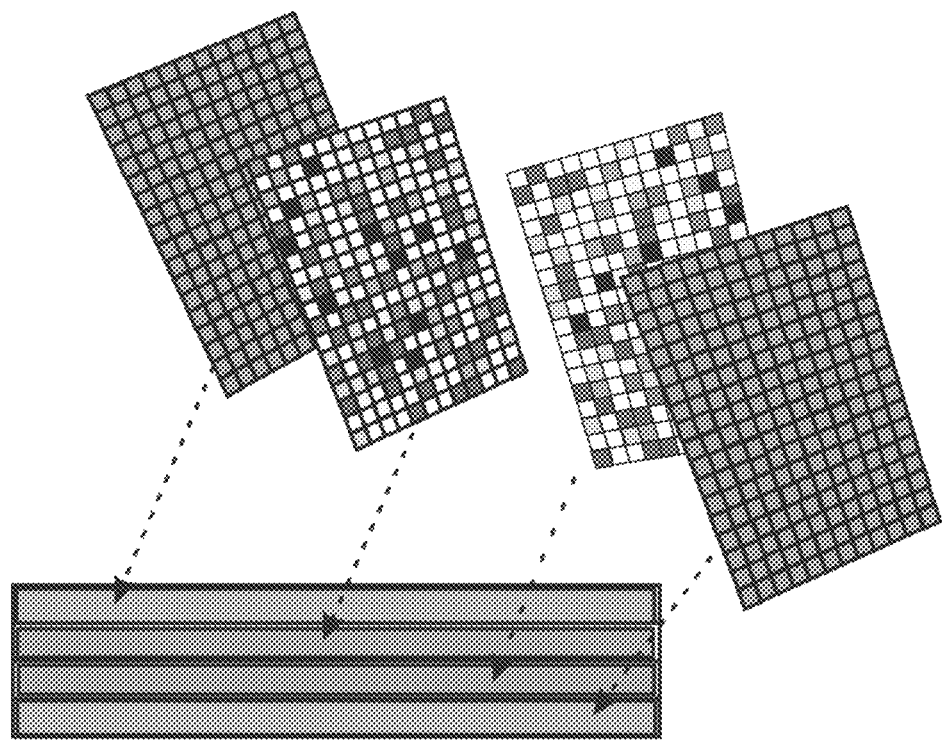

FIG. 20 Double Layer Rock This figure shows a 3D pack comprising 2 2D keys enveloped by two external measurement platforms from where conductivity is measured over all the bins in each 2D key.

Figure 21:
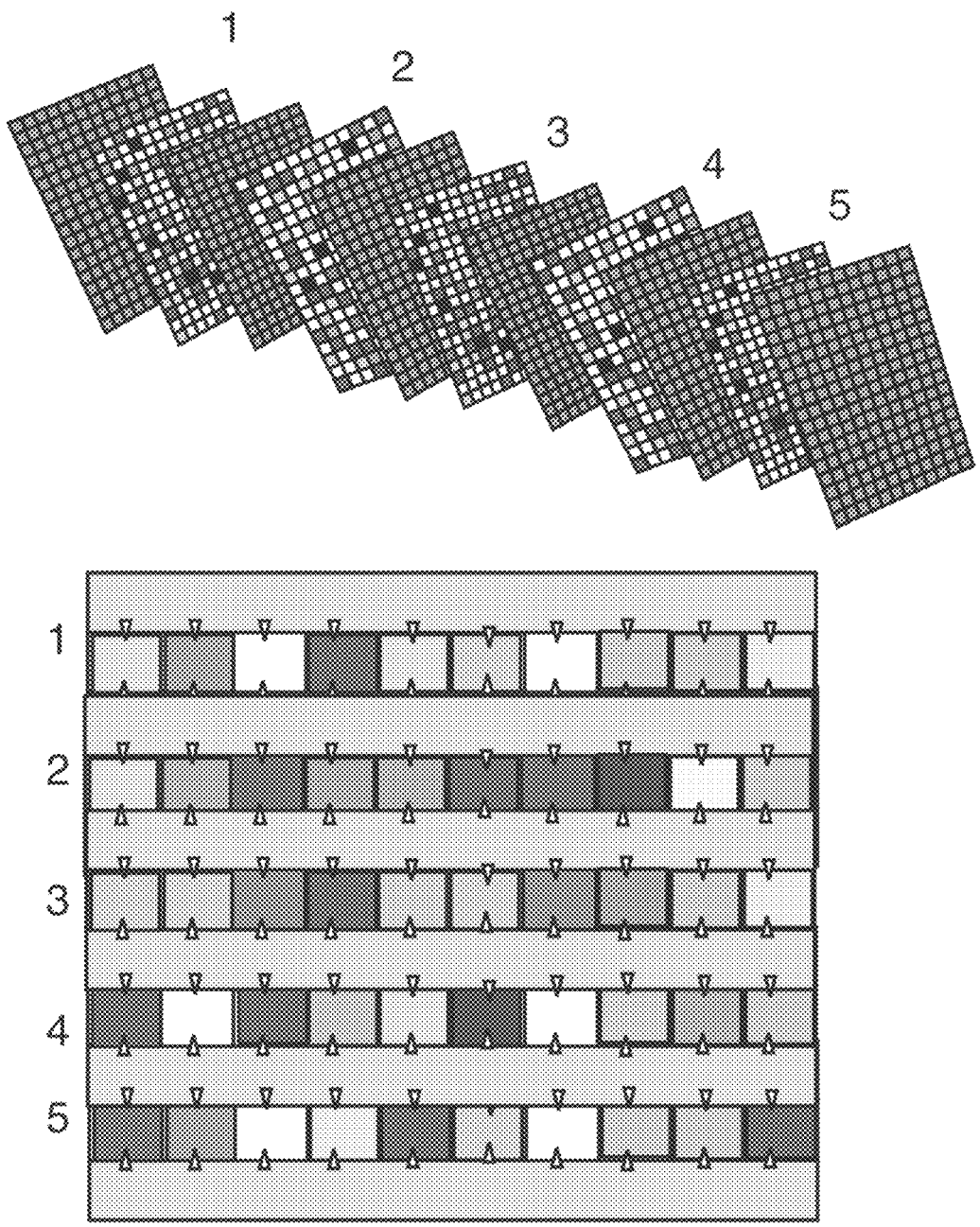

FIG. 21 Multi Layer Conductivity Rock This figure shows how an arbitrary number of layers of 2D 'Rocks' are put together through intermediate measurement platforms with ports aligned with all the bins of the 3D Rock. The content of the bins is randomized.

Figure 22:
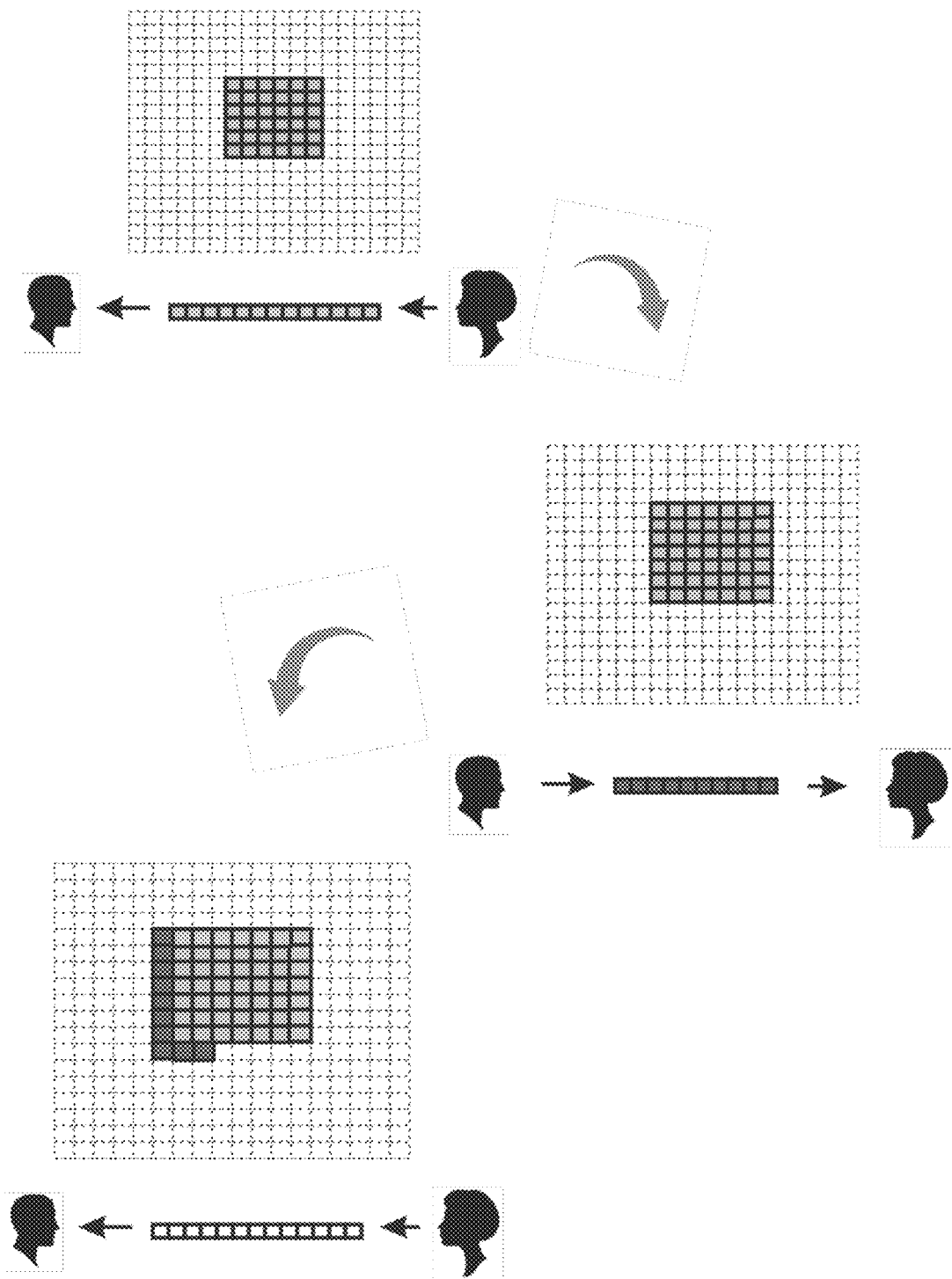

FIG. 22 Usage Driven Key Enlargement This figure shows first (top) two communicators Alice and Bob using an elusive key cipher. Alice at some point sends a plaintext message to Bob with the intent to use this message (sequence of plaintext letters) as an addition to the shared elusive key. The current key has k bins, marked on the 'scaffolding' from bin 1 to bin k. The added key material (shown in blue), containing k' letters, is then used to increase the key size from k to (k+k') bins, where the extra k' bins are added in order based on an arbitrary sequence agreed upon by the communicators. before the add on bins 1 to bin k were non-empty marked on the scaffolding; after the add on the key will have k' extra bins. The figure then shows how Alice and Bob keep communicating, now with the increased key. At some point as shown, Bob sends Alice a plaintext message (marked in red), with the expressed intent to add this message comprising k" letters to the current bin, using the agreed upon order. After adding the extra k" letters (occupying k" bins on the scaffolding), the key will feature (k+k'+k") bins. And so on, the key will grow the more it is being used, keeping the cryptanalytic barrier high. The key material plaintext messages are encrypted with the elusive key at its current state.

FIG. 23 Replica Illustrations This figure shows two Replica cases. In the upper part a 5 letters Template is shown how its letters correspond to the letters in the feed string. The first letter in the template corresponds to the $3^{rd}$ letter in the Feed. The second letter in the template $T_2$ is the same as the $5^{th}$ letter in the Feed, $T_2=F_5$. Similarly $T_3=F_6$, $T_4=F_{10}$ and $T_5=F_{13}$. This leaves out the last two letters in the feed 'XY' as the residue: Feed-1='XY' REP Template-1. The lower part of the figure shows a three letter template that repeats is counting over the feed string. The template is counted 4 times over the feed, and no residue is left in the feed, so we write: Feed-2=0 REP Template-2

Figure 24:
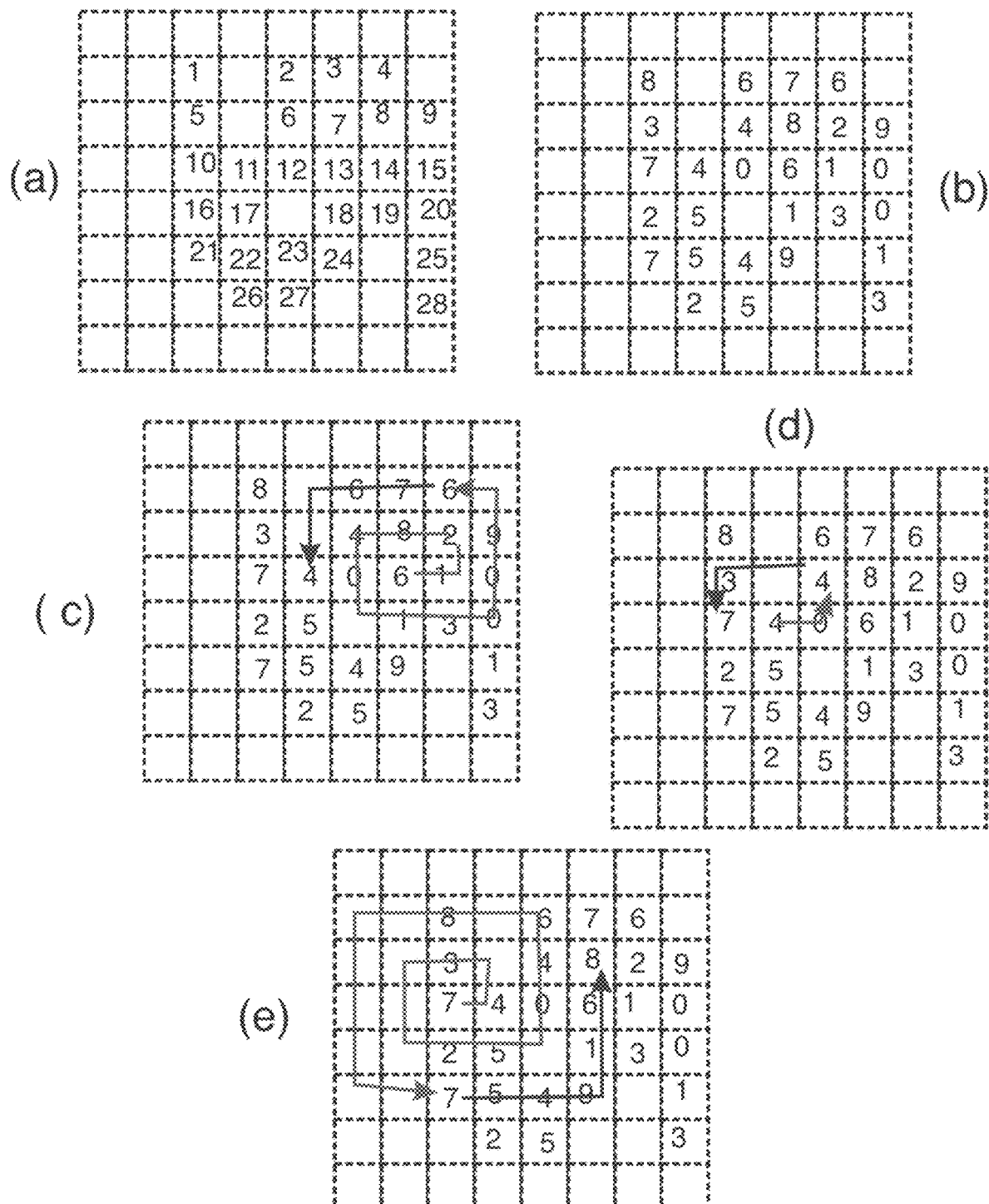
Figure 25:
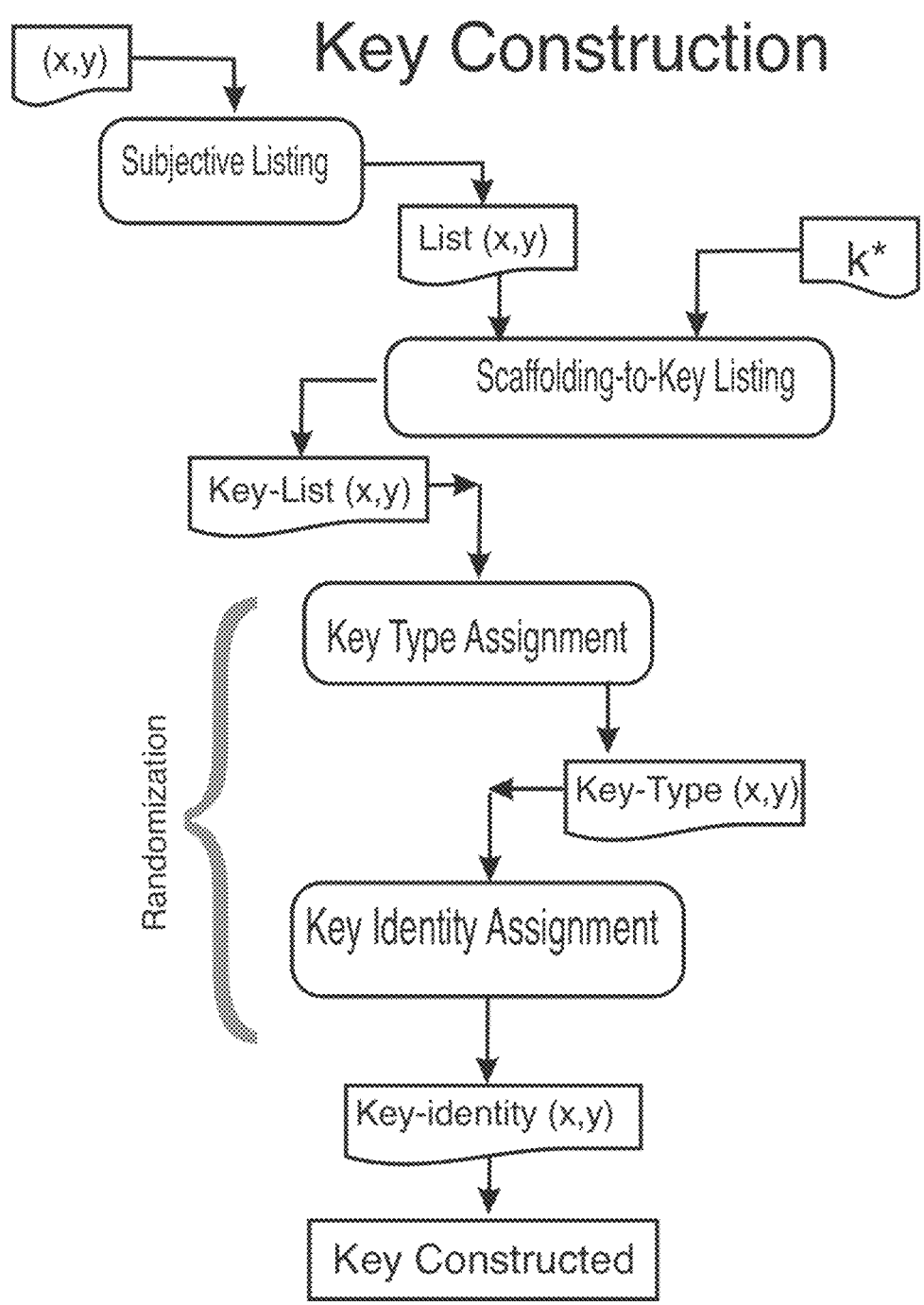
Figure 26:
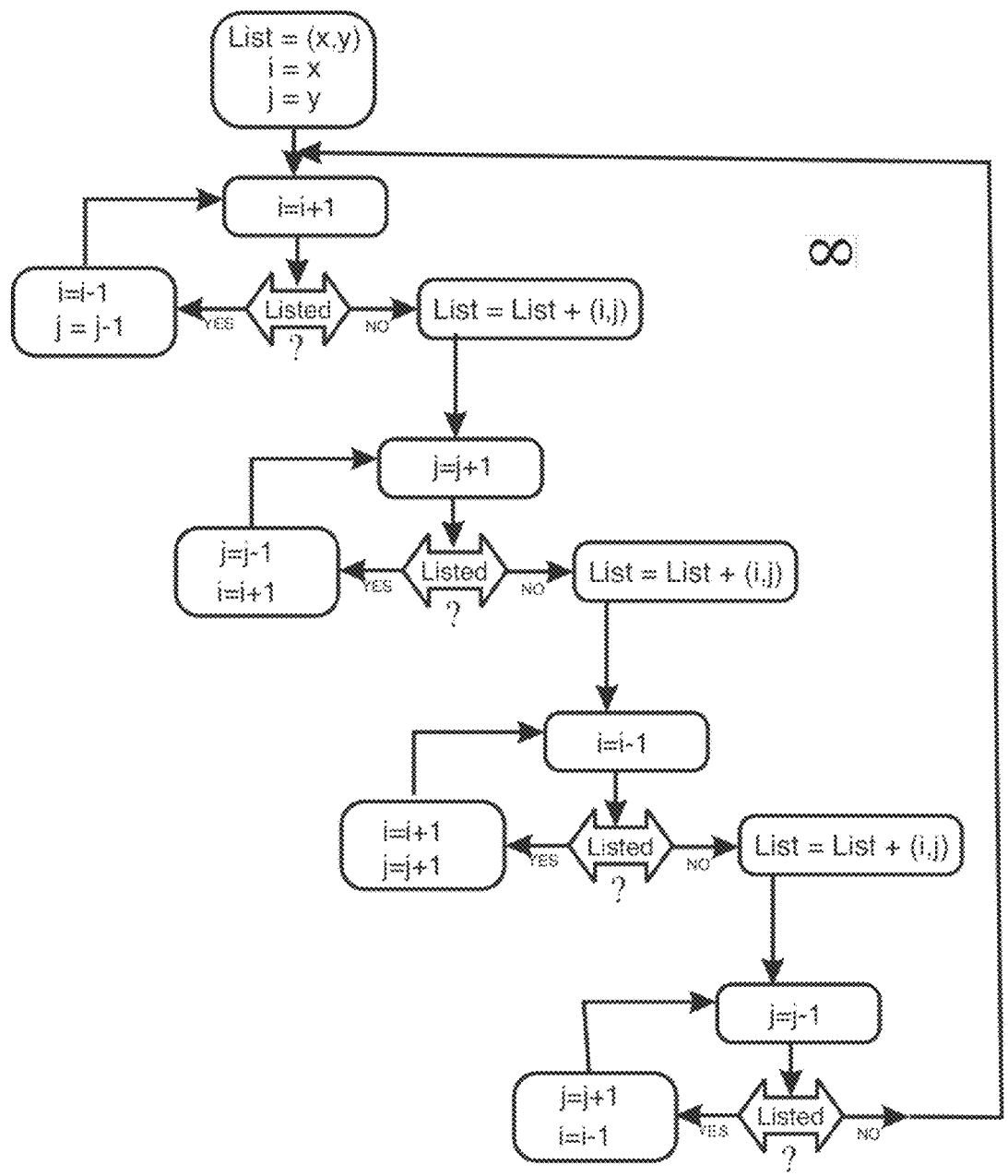
Figure 27:
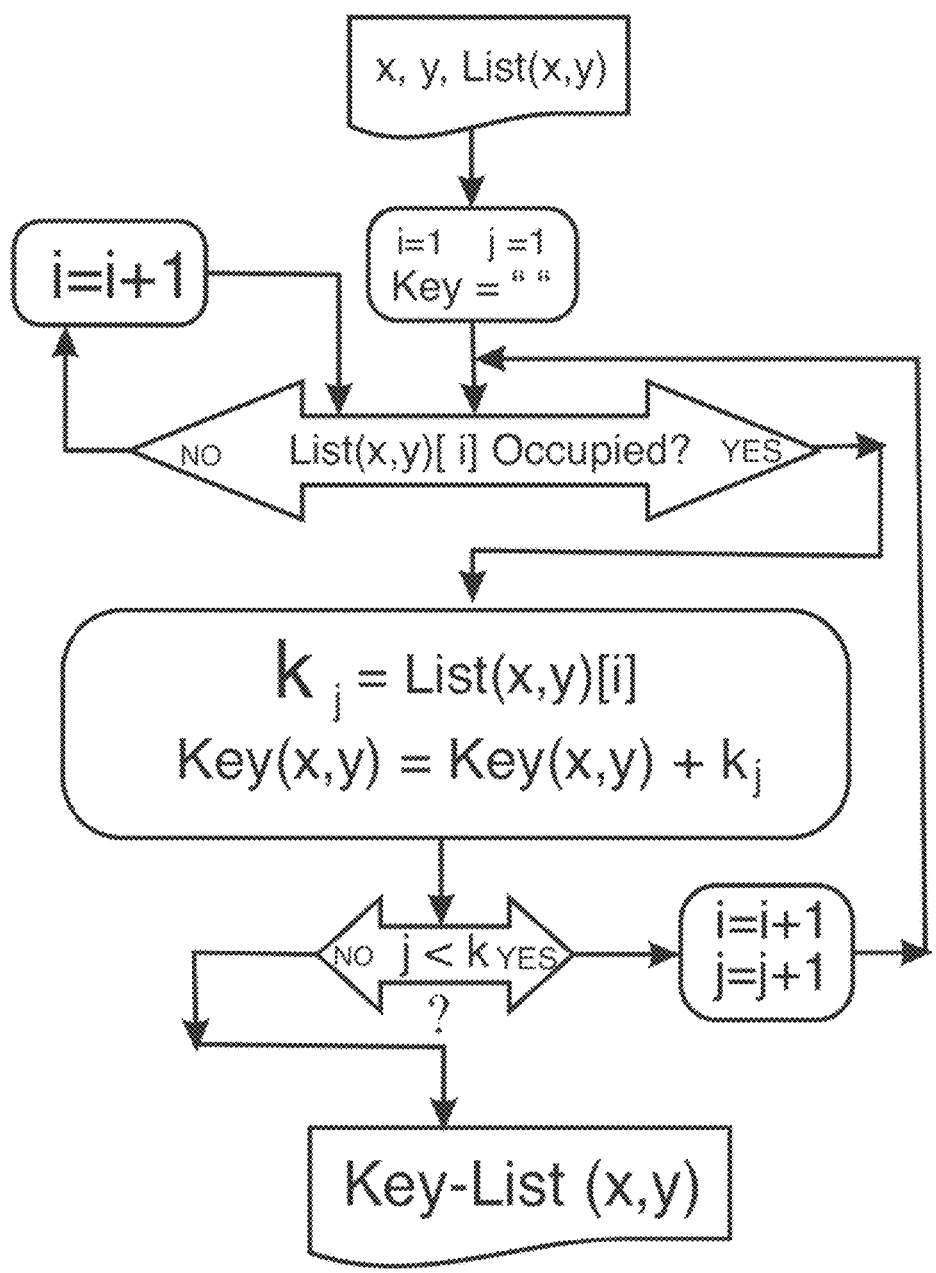
Figure 28:
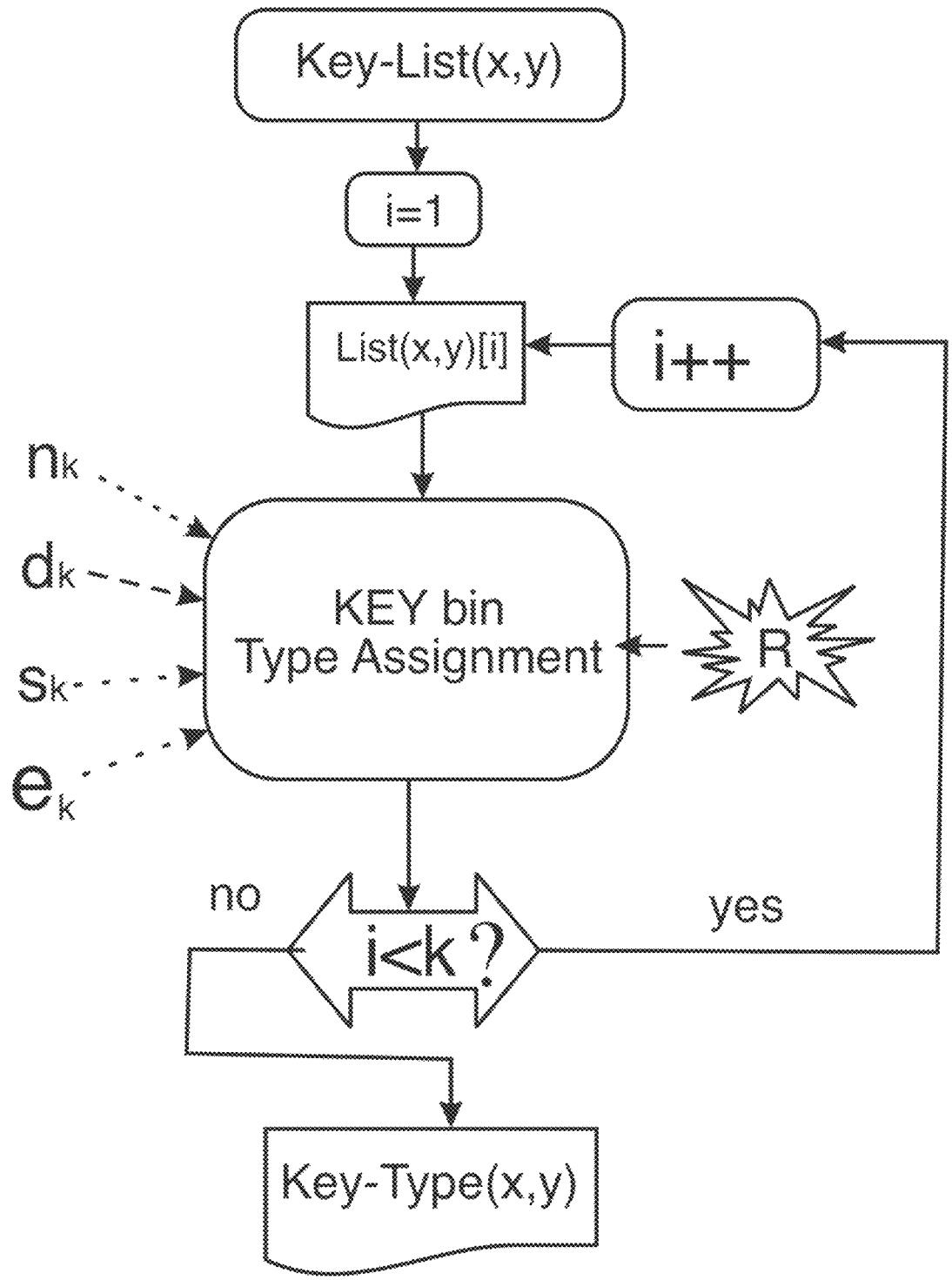
Figure 29:
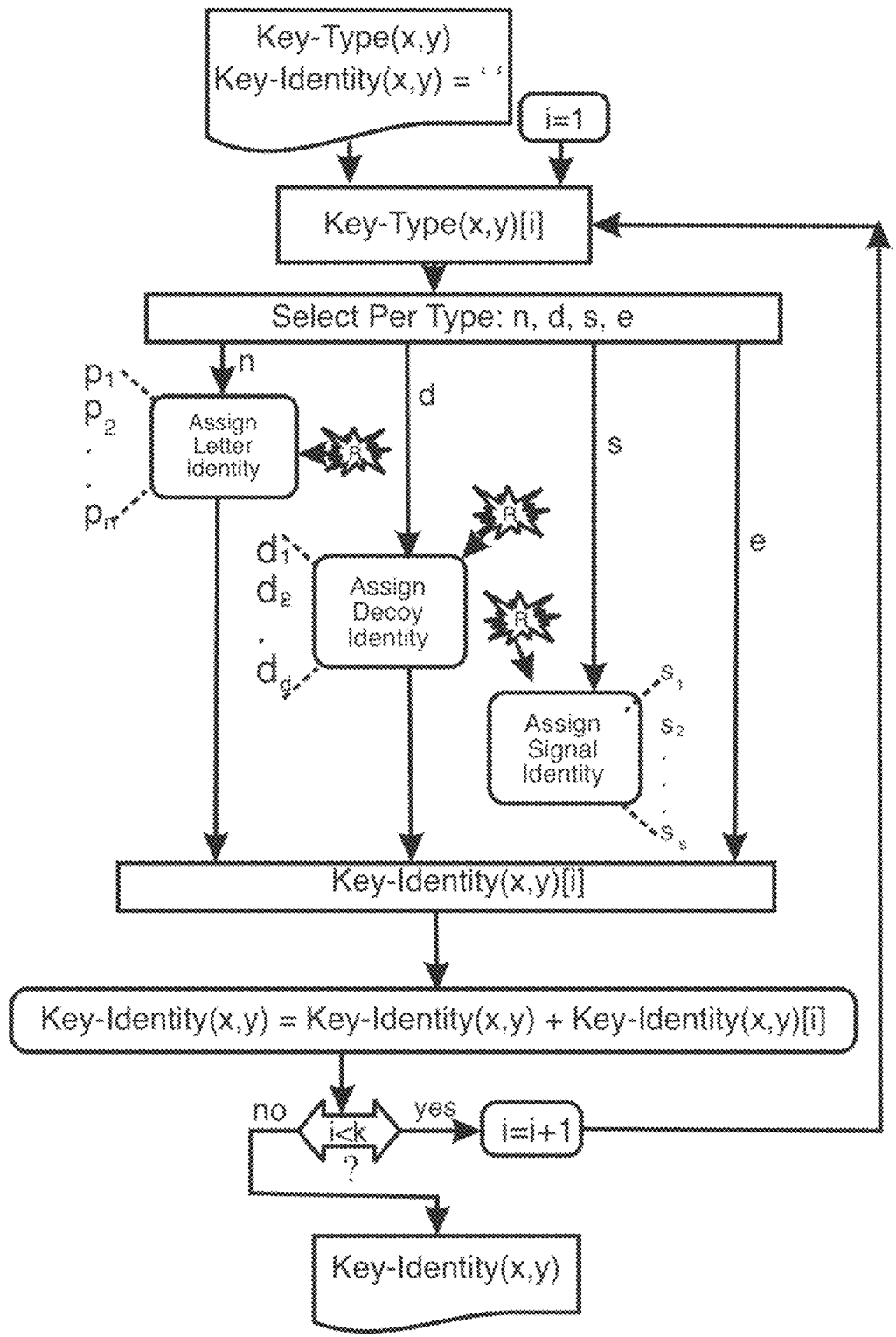
Figure 30:
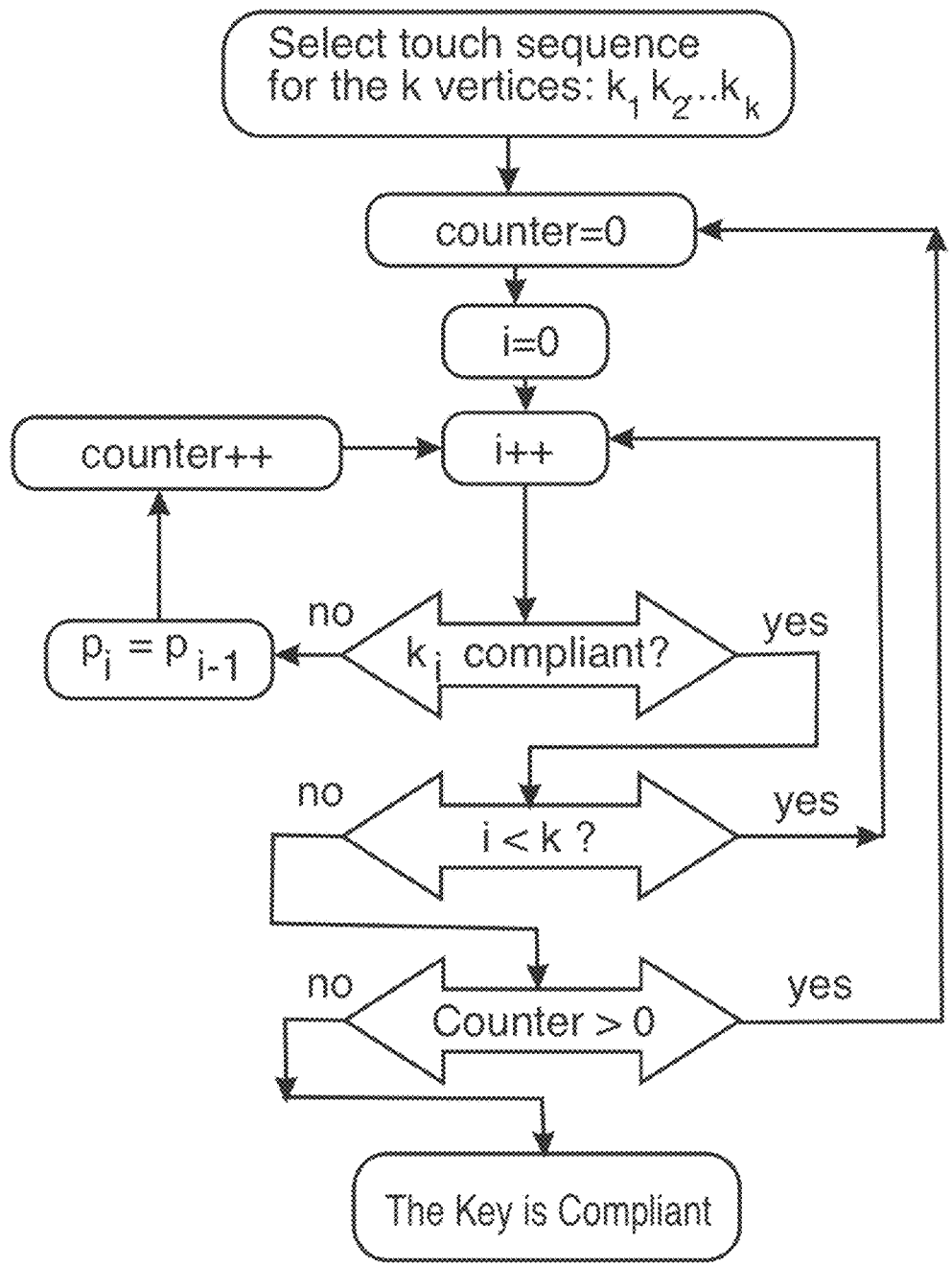

FIG. 24 Elusive Key Manuel: This figure illustrates implementation of the Rock Elusive Key with 'paper and pencil'. Alice and Bob share the 8×8 scaffolding on which the numbers 0-9 are written into 28 bins as shown in part (b) of the figure. Part (a) of the figure shows an objective pre-agreed order 1-28 marking the occupied 28 bins. Alice wishes to send Bob the code "478". She selects a random bin, #13 (on (a)). As seen on (b) bin #13 is occupied with the number "6". Alice now regards bin #13 as the starting point of a snail sequence, and takes this sequence to the next bin occupied by the same number as #13, namely "6". As shown on (c) this points to bin #4 (on (a)). Counting 3 steps on the same snail sequence one arrived at bin #11 (on (a)) containing the number "4" which is the first letter in the plaintext "478". The sequence shows on part (c). Now #11 becomes the origin of a new snail sequence as shown on part (d). The second time the contents of bin #11 (on (a)), namely "4" appears on this snail sequence is bin #6 (on (a). From bin #6 one steps 2 steps on the same snail sequence to arrive at bin #10 (on (a)) which contains the number "7". Now bin #10 becomes the origin of a new snail sequence as shown on part (e). This snail sequence continues until bin #21 on (a), which contains the same number as bin #10 on (a). From bin #10 on (a) one steps 6 steps to bin #7 on (a) which contains the number 8.

Now Alice passes to Bob the following string of numbers: 13-3-2-6. This is the ciphertext. Bob interprets the ciphertext as follows: "13" is the "pre anchor" for the message. He identifies it on part (a). Bob identifies the content of bin #13 to be "6" part (b). From there Bob starts the snail trail until encountering the next bin contains the number '6'. This happens on bin #4, part (a). From bin #4, Bob keeps counting "3" steps (because Alice's ciphertext indicates "3" after "13")—see part (c). This lands Bob on bin #11. There Bob reads that the content of bin #11 is "4"—which Bob interprets as the first plaintext letter. Bob then starts a new snail trail from bin #11 and finds bin #6 as the next bin that contains the same number "4" (part (d)). Bob then reads the next integer in the ciphertext "2" and moves 2 steps from bin #6 to land on bin #10, containing the number "7" which Bob interprets as the $2^{nd}$ plaintext letter. From bin #10 Bob draws a new snail trail to find bin #21 as containing the same number, "7". From bin #21 Bob steps 6 steps (as indicated in the ciphertext string) and lands on bin #7 which contains the number "8" (part e). So in summary, Alice sends Bob the ciphertext string C=13-3-2-6 and Bob decrypts it to the plaintext M that generated C: "478":

"478"→"13-3-2-6"→"478"

As shown, both the encryption and the decryption can be handled manually on a piece of paper. Yet, it incorporates the power of the Rock. A scaffolding of 8×8 containing 10 numbers (0-9) and one 'empty' state allow for $11^{64}$ possible keys. Enormous! What's more, the hacker does not know how big the key is.

BRIEF DESCRIPTION OF THE SEVERAL VIEWS OF THE FLOW CHART DRAWING

FC 1 Key Construction

This flowchart gives an overview of the method used to construct the elusive key.

The key is constructed on an array of bin framework, known as 'the scaffolding'. The depiction relates to two dimensional keys. Each bin in the scaffolding is identified by two indices, a horizontal count, x, and a vertical count, y. The key constructors select an arbitrary bin (x,y), assign this bin the sequential count 1, and from that bin on, one applies the subjective listing algorithm, (the snail trail) to sequence all the bins in the scaffolding. The flow chart shows how the (x,y) address is processed by the subjective listing module to generate the List(x,y)—the sequenced bins. The key constructors then decide on a key size—number of bins to constitute the key, k, and from k they determine a larger figure k*>k, planning for k*-k bins to be empty bins spread through the lump of occupied bins. This allows for the "scaffolding to key listing" operation to assign the marked List(x,y) to the k* bins: bin-1, bin-2, . . . bin-k*. This creates the Key-List (x,y).

The Key-List(x,y) then undergoes the two randomization operations to secure that no pattern is being allowed into the key construction. As the flowchart shows the first operation is "Key Type Assignment", in which all the k* keys are assigned one of the possible types. Bin may be a letter type—assigned a letter from the plaintext alphabet. A bin may be decoy type—assigned as a 'fake letter' of the plaintext alphabet. A bin can be signal type, where it is used for administrative purposes. Finally, a bin may be 'empty' (a hole). Note: when the elusive key is used by the Walk method then the decoy and the signal bins are also considered empty. This assignment of type per bin is done through the use of a high quality built in or associated randomness source, to ensure no pattern is sneaking in. After having each of the k* bin being assigned a type, resulting in the Key-Type(x,y), the procedure moves on the "key identification assignment" where according to their type, each bin is assigned a particular instant of that type, and this assignment is also governed by a high quality randomizer. So any bin assigned to be a letter type is assigned one of the n letters of the plaintext analphabet. Each bin assigned as decoy type, is specified as one of the decoy alphabet letters. A signal type bin is assigned one of the signal vocabulary used in the procedure. An empty bin is simply empty, there are no different types of empty. Once this randomized specification of the k* bins is done, there are k bins that are not empty, they form the Key-Identity(x,y) list, and fully define the elusive key, comprising of k non-empty bins with holes and rugged surface defined by (k*−k) empty bins mixed with the k non-empty bins. The same methodology works for higher dimensionality cases. Important Note: the elusive key can keep growing, adding more and more bins, as one desires FC2: 2D Array Subjective Listing (Snail Sequence)

This flow chart captures the essential key sequencing procedure where an arbitrary bin the 2D array (scaffolding) is regarded as bin-1, and from it in a snail like trajectory, all the bins of the array are marked by order: one bin touches the bin before and the bin after. The snail grows and grows indefinitely. The FC shows an arbitrary bin address input (i=x,j=y). this is bin-1. next the value of i is incremented, pointing to bin with address (i+1,j). The procedure then checks if this bin is already in the list of counted bins. If it is, then the value of i returns to what it was before it was incremented, and the value of j is also decremented. A new bin is specified. If it too is already listed then the same sequence happens, again and again until an unlisted bin is found. That unlisted bin is then being listed, and now the roles of the i-count and the j-count reverse. In the third round the value of i is decremented and in the 4th round the value of j is decremented. The fourth round returns to the beginning and so continues indefinitely all the bins in the array are sequenced in a snail-like fashion around the arbitrary choice of bin 1 (with address (x,y)).

FC3 Mapping a Scaffolding List to a Key Sequence

This flowchart maps the bin sequence List(x,y) described in FC 2, to a list of k non-empty bins that constitute the elusive key. The procedure shows how the List(x,y) is checked bin by bin, and all the non-empty bins are attached a sequential number from 1 to k.

FC 4 Key Type Assignment

This procedure is the first of two randomized procedures used in constructing the elusive key. The marked k* bins, as identified earlier, are now each submitted to a randomized decision to determine their type: normal plaintext letter, decoy letters, signals, or 'empty'. The randomization is modified by the planned number of bins of each type. The key constructors (the users who construct the key) determine $n_k$, $d_k$, $s_k$, and $e_k$. ($n_k+d_k+s_k+o_k+e_k=k^*$). These are the counts for how many plaintext letters will be present on the key, how many decoy letters, how many signals and how many bins will remain empty, respectively. Note: to avoid confusion, a key which is built to contain k non-empty bins, will be associated with an arbitrary number (k*−k) of empty bins, so k* bins are processed in the key construction, k of them will be non-empty. The listed bins will be randomized by order. Initially the chance for a bin to be assigned as a plaintext letter will be $n_k/k^*$, the chance for a bin to be decoy type will be $d_k/k^*$; the chance of a bin to be signal type will be $s_k/k^*$, and the chance of a bin to be empty will be $e_k/k^*$. Each time a bin is a assigned a type, then its randomization count is decremented, and hence when all the k* go through the type randomization process there are exactly $n_k$ plaintext letters type, exactly $d_k$ decoy type, exactly $s_k$ signals, and exactly $e_k$ empty bins.

Illustration: Let $k^*=100$, $n_k=45$, $d_k=10$, $s_k=1$, and $e_k=44$ The randomization process will pick a plaintext letter at a chance of 45%, a decoy at a chance of 10%, a signal at 1% and empty bins at 44%. If the first two bins were assigned a plaintiff letter type and the third bin was assigned as empty, then for the 4th bin the chance for it to be a plaintext letter will be: 43/97; to be decoy type will be 10/97 and to be a signal: 1/97, and to be an empty bin: 43/97. The type assignment mathematics is described ahead:

Given $n_i$ items of type i, for i=1,2 . . . t, to be distributed into N ordered bins where $N=\Sigma\, n_i$ over t. The objective is to make the distribution unpredictable as possible. For example: having 3 letters X, 5 letters Y, and 2 letter Z, they can be distributed in 10 ordered bins as d=XXXYYYYYZZ or as d'=XYYXZYXYYZ, where d' is more random than d (among many other distributions).

Methods: 1. randomly assign each bin according to the modifier $n_i$ . . . approximation. In this method every bin assignment is randomized by randomly picking an integer 1≤r≤N. Then assigning the bin to type j where $$\Sigma n_i \text{ for } i=1,2,\ldots (j-1) < r \leq \Sigma\, n_i \text{ for } i=1,2,\ldots j$$

This method does not guarantee the desired results.

2. after assigning $m_i$ items for item i for i=1,2, . . . t, there are $(N-\Sigma\, m_i)$ bins to be allocated. Doing so with the following modifiers $n_i-m_i$. This method guarantees the desired results. The flowchart shows how the randomizer goes through all the listed bins and determines their type assignment.

FC 5 Key Identity Assignment

The previous procedure determined the type of each of the marked k* bins. $e_k=k^*-k$ of them are empty, and constitute 'holes' in the key or rugged surface. The others (the non empty) have to be further specified. Every plaintext letter type will have to be assigned a plaintext letter, similarly for every decoy, per decoy types, and signal per signal types if any. The charts shows how the key type assigned list Key-Type(x,y) serves as input, and how the procedures proceeds through the various bins in the list and for each, it assigns a specific option consistent with the assigned type. Nominally all the letters of the alphabet and all the decoy letters have an equal chance to be selected for their type. However, the key builders may decide to have, say, more instances for more popular letters, say in the plaintext, or apply any other considerations to modify this flat probability curve. Once the system finishes to go through all the type assigned bins, then each type is further specified and the key is fully defined, and ready to serve. Its content, size and shape are randomly determined, exhibiting no pattern.

FC 6 Travel Requirement Compliance Imposing Procedure

This procedure is applicable for the 'walk' method where the plaintext letter assignment to bins has to comply with the zone based travel requirement. It operates as follows: first identify a bin that complies with the requirement, call it bin-1. Use that bin as an anchor for a key sequencing order of the k bins of the key. Check the next bin (initially bin-2). If it too complies with the requirement then move further to the next bin (initially bin-3), and keep so moving forward until some bin i is encountered for which the travel continuity requirement is not fulfilled. To rectify this non-compliance, the procedure will change the letter assignment for bin-i to the letter assignment for bin-(i−1). Since bin-(i−1) is in compliance, then this letter identity change for bin-i will render bin-i in full compliance too. Once done, go to the next bin (i+1), and so on, bin by bin. Every time a non-compliant bin is found switch its identity to the identity of the bin before it in the sequence. When this process reaches the end, bin-k, the procedure checks if any identities were switched (in the inspection run from bin 1 to bin k). If some switching took place, then the procedure described above is repeated, again and again until it is carried out from bin 1 to bin k with no identity-switching taking place. Once this happens it is clear that the full key is in travel continuity compliance and the procedure terminates.

FC 7 Travel Requirement Compliance Imposing Procedural; Illustration.

The flow chart illustrates a 5*5 array. used as a key for the 'walk' option of the elusive key. The 25 bins in the key are sequenced with the middle bin as $k_1$, and the sequence is shown on the bottom left table (array). In part (1) of the flowchart the randomized assignment of plaintext letters is shown. There are four plaintext letters X, Y, Z, and W distributed all across the key. The first bin, $k_1$, is checked and found in compliance with travel continuity requirement. So according to the compliance imposing procedure, one moves to check bin-2 of the key per the agreed upon sequence as shown on the graph below left. Bin-2 is also compliant and so are all the bins up to bin-10 (per the sequence in the table below left). In order to render bin-10 compliant then its original letter, X is being replaced with the letter identity of bin-9 which is W. This rectifies the non compliance of bin-10 and the procedure goes on checking further bins by order. When it arrives at bin 14 it encounters a 2nd case of non compliance and hence replaces the identity of bin-14 with the identity on bin-13. Similar exchanges happen with bin 20 and bin 25. This completes round 1. The procedure needs to start another round because identity switching occurred in this round (4 such occurrences; bins 10, 14, 20, and 25). The second compliance imposing procedure round is shown in part (2) of the flowchart. Here also several bins are found in noncompliance and undergo identity change. These are bins 7, 13, 24 and 25 (marked in blue, the replaced identity also marked).

These changes call for a third round, as shown in part (3) of the flowchart. In this third round only a single bin needs identity replacement: bin 6. So a 4th round is required, as shown in part (4). This 4th round of the compliance imposing procedure encounters no identity switching, all bins are found compliant, which means the entire key is in compliance and the compliance-imposing procedure finished its operation. The key is ready to encrypt and decrypt any message of any size.

DETAILED DESCRIPTION OF THE INVENTION 1.0 Introduction

Presenting a specific cipher ("The Elusive Key", EK) that can deliver the security capabilities described in the continued application. The cipher places the control into the hands of the users and the users can pass control to an AI controller or to a threat-responsive randomizer. This is a critical point, elaborated below. The principles of the EK cipher are also laid out ahead. The Elusive key earns its title because its size and its shape—its geometry—is part of its secret. It features data organized on a 'scaffolding' so that its contents and the set of relationship between the parts of the key are all entropy contributors. The key is constructed through a series of ad hoc randomized decisions that wipe out any pattern to be homed in by a cryptanalyst. Say then the attack on the Elusive key cipher is limited to brute force, which in turn cannot be conclusive on account of the ever-present possibility that a larger key is the actual key. We present here two Elusive-Key encryption methods: (i) the "Walk" option, and (ii) the "Rock" option.

In the "Walk" option a plaintext message is regarded as a 'travel guide' in the sense that the plaintext letters serve a list of destinations to be visited by order by a traveler on the key (which serves as a map, or say a Rock-map). The destinations are marked with plaintext letter alphabets. The 'roadways' between these destinations are marked with ciphertext letters. Hence a trip that is defined by a list of destinations (plaintext form) can be equivalently described by a list of the traversed roadways (the ciphertext alphabet), and hence anyone in possession of the Rock, the map, will readily convert the list of destinations to the corresponding list of roadways, and vice versa, anyone with a list of traversed roadways will translate this list to a list of visited destinations. Anyone without the Rock will remain in the dark. The geometry of the key, the Rock, is essential for its security.

In the "Rock" option the location of a given plaintext letter points to the location of the next plaintext letter in the plaintext message, where such location may be on the other side of the Rock. The information that guides the decryptor (the one performing decryption) to spot the location of the next letter is given in a way that only the possessor of the key will be able to use it to find the next key. The two methods complement each other and have unique strengths in various applications. Both rely on a key of convoluted secret geometry and randomized content. In both cases only part of the key is used for any instance of encryption. In both keys the avalanche effect is not very tight, but can be made as tight as desired. Owing to the complex geometry of the key, a small key would remain mathematically secure for quite a long message traffic.

Both the Walk and the Rock options are of the Tesla Cryptography class, as defined in the publication: "Tesla Cryptography:" Powering Up Security with Other Than Mathematical Complexity, https://eprint.iacr.org/2023/803. The name Rock is taken from a related technology "The Rock of Randomness" specified in three U.S. Pat. Nos. 10,467,522; 11,062,279; 11,548,309].

1.1 Threat Responsive Cipher

All common ciphers come with a built-in defensive posture based on non-secret well defined mathematical complexity. And as such they serve as perfect target for serious cryptanalysts. Proposing a new class of ciphers: Threat Response Ciphers (TRC) which change their operation according to the perceived threat. The resultant operation may bring about an increased security burden in order to gain an increased security posture to match the perceived threat. The dynamic response may be carried out by a (i) remote agency, (ii) by direct users, by (iii) a built-in randomizer, by (iv) a monitoring AI agency.

The TRC may be set up as a software system meshed into a larger software or a network setting, or it may be a self-contained hardware enclosure.

The TRC cipher operation is based on the Tesla cryptography principles wherein security is projected not through mathematical complexity but rather through dynamic randomization. The response amounts to changing, upgrading the randomized input, achieving the 'gold standard' of One Time Pad security and beyond.

1.2 Tesla Cryptography

Tesla cryptography is elaborated in reference [https://eprint.iacr.org/2023/803]. It shifts security to randomization activity which can be enhanced to meet a perceived threat. We see ahead several ways to pump in more randomization to generate stronger security. Randomization may apply to the key, the ciphertext, and the encryption algorithm. The particular tesla cipher described herein is especially strong with key randomization. It is regarded as a key-elusive (KE) cipher.

1.3 Response Agency

Response agencies are: (i) human cipher operators, (ii) remote control, (iii) built in randomizer, (iv) built in smart response unit. Remote control may be plain or may be smart. Human cipher operators are the personnel that is closest to the cipher itself. The ones who push a button or otherwise activate the data protection mechanism. It would be a policy decision to give the direct operators an overriding capacity, or only a suggestive role. Depending on their training and rank. The remote controllers are typically network manager who set up the level of security that is applicable at any moment for the entire network, or to parts thereto. They will set up the randomization parameters via an agreed upon code.

1.4 Built in Smart Response Unit

Options: the smart response may account for (i) usage extent, (ii) usage pattern, and (iii) contents.

Usage deteriorates security, albeit, very slowly. The cipher designer is in position to use probability calculus to properly determine the rate of losing security with usage. And therefore to prop up the randomness levels used for later usage. There are known use pattern cryptanalysts will use to crack a cipher. These are short repetitive plaintexts. The built in 'smarts' will detect such cryptanalytic pattern as opposed to normal use and react with pumping more randomness. AI engines may be loaded with means to identify phrases and terms that suggests that the message they encrypt are of special importance, and then build up a larger amount of randomness to better protect this high value content.

1.5 Response Mode

The Elusive Cipher may be in various modes: (i) embedded in a larger software system, (ii) network dependent, (iii) hardware enclosed.

1.5.1 Hardware Enclosed

The TRC may be enclosed in a hardware wherein the integrity of the hardware enclosure is constantly measured and if violated or attempts to violate are detected then the internal system self-destructs. The TRC enclosure will have two data entry ports one for the plaintext and one for the ciphertext, and also two data ports for output, one for plaintext and one for ciphertext. The TRC enclosure (TRCE) will have two types of interactions with the world: encryption and decryption. The TRCE is powered by a built-in battery. The battery once getting close to be exhausted, uses its last power to self-destruct. Destruction regards the software and the key material.

1.5.1.1 TRCE Integrity Assurance

Any of the means described in US patent [10,445,730] will be optional. A different option is based on the Rock of Randomness technology [U.S. Pat. Nos. 10,467,522; 11,062,279; 11,548,309]. Usually a rock of randomness based identity authentication is based on external measurement of conductivity. In this application the system that keeps measuring randomized combinations of conductivity from randomized set of points on the enclosure is placed inside the enclosure. The idea is that any attempt to tamper with the hardware enclosure will cause disruption somewhere in the conductivity measurements, and will kick off the self-destruct system to prevent from others to read the content of enclosure. The internal system will have built in the thousands or more readings from various pole combinations like it is done with the rock of randomness, and constantly compare fresh measurement with the preloaded measurement for the same constellation of positive and negative poles.

1.5.1.2 TRCE Contents

Functionally the TRCE will contain: (i) the cryptographic key, (ii) the operational software (encrypton/decryption), (iii) a randomization source, and (iv) built in Threat Response subsystem.

1.5.1.3 The Randomization Source

Possibilities: (i) algorithmic, (ii) filtered algorithm, (iii) physical complexity, (iv) quantum randomness Quantum randomness: options: (i) dynamic or (ii) static: i.e. Rock of Randomness. U.S. Pat. No. 10,467,522 If the Rock of Randomness is used then the same technology may be used to generate randomness and separately may be used to ensure physical integrity of the hardware enclosure.

1.6 The Threat Response Subsystem

The TRCE response subsystem will be either (i) flat randomizer, or (ii) smart response. In the first option the level of randomization used to project security will steadily grow with use. In the latter option, the response will be sensitive to everything impactful that can be learned by the internal AI system.

1.6.1 flat randomizer

The TRCE comes with a planned amount of work (encryption or decryption) it can make. Based on this design parameter the randomizer will be set up to increase randomization output to have it at a desired maximum close to when the system will die (stop servicing). This reflects the idea that the more a Tesla cipher is used the closer it gets to some degree of compromise, and a measured increased in randomization keeps security at target level.

1.6.2 smart response

Smart response may be graded:

1. usage amount driven 2. usage pattern driven 3. repetition alert 4. code-book driven 5. semantics driven Pattern sensitivity is to timing, length of message. Repetition of same or similar message raises cryptanalytic suspicions. A built-in code book may list words that if found in plaintext then it suggests the related message is extra important.

1.6.2.1 Semantics Driven Response

Semantics driven response is based on analysis by AI means of the significance of each phrase and adjusting the quantity of randomness accordingly. An extra advanced way to use AI is to spot that the cipher (say hardware enclosed) was taken over by an adversary, and then decrypt various ciphertexts to misleading plaintexts.

1.6.2.2 TRCE use cases

TRCE may serve (i) military usage, (ii) serving poorly trained operators, (iii) one way applications Poorly trained personnel: Encryption and decryption are complex operations often time handled as part of a larger system operated by personnel that is not properly trained for cipher work. The new Tesla ciphers put the responsibility to project security on the shoulders of the users. The users are not ready for this responsibility, so they rely on the "box"

that carries out the smart response with its built-in AI capability. One Way Use: TRCE may operate one-way only: either only encryption or only decryptions. There are various use cases: (i) replacing the vulnerable public/private key ciphers, (ii) authentication, (iii) limited service.

1.7 First Principles

The first principles underlying this invention are (i) randomness with complexity—creates vulnerabilities, randomness with simplicity—projects security. (ii) Security responsibility is best if placed in the hands of the user who will be harmed if it fails.

1.7.1 Randomness:

As discussed elsewhere mathematical complexity which is exercised with random keys, operates under the fear that some particular keys allow for a smart mathematician to extract the plaintext from the ciphertext. Such 'weak keys' are very hard to find. The attacker is much more motivated than the defender to find them, and if they do, they breach the security. As nominal security is deemed stronger as complexity gets bigger, so does this 'back door' vulnerability: the greater the complexity, the greater the chance for a mathematical shortcut and for 'weak keys' to be found. This invention shifts the responsibility for security from complexity to randomness—combined with simplicity. Simplicity offers no room for further simplification, and randomness may be used in an open-ended way—a new security idea.

1.7.2 User Centric Security

The idea is to change the concept of a cipher. Today ciphers are "black boxes" they project security on account of their projected complexity—a fixed measure which may be compromised in stealth and the user is helpless. We envision here a cipher that is a means to process a flow of randomness and use it to project security. The user decides how much randomness to deploy, and handle its inconvenience, in order to achieve the desired level of security. The user decides—a shift of responsibility.

2.0 the Elusive Key Cipher (the "Walk" Option)

A nominal key is a bit string of known size and secret bit identities. For a string comprising s bits the number of possible strings is $2^s$. Because the value of s is known then the key is the same regardless of how much data it is processing. It becomes the subject of brute force cryptanalysis with all sorts of accelerators thereto.

The elusive key cipher, by contrast, is constructed with a key that offers a secret content, a secret size, a secret shape, and is further complicated by replacing the linear string with a full fledged graph: a bunch of vertices connected through some edges so that from every vertex one can proceed through the defined edges to any other vertex on this graph—which is a map by regarding the vertices as destinations, and the edges as roadways from one destination to the other. Each vertex and each edge are associated with a letter. Letters are represented by a fixed size set of bits. For a so constructed key comprising of s bits the level of entropy is much higher: on top of the $2^s$ possibilities of bit identities, one must account for the various ways these s bits are spreads over the v vertices in the key (the graph, the map, the Rock—synonyms), and then account for the geometry that defines the key as a structure formed with e edges connecting v vertices. While for a nominal key the value of s is well known, for the elusive key (EK) the values of v, and e (number of vertices and number of edges), as well as the structure of the key is all part of the secret.

We recall that the new approach to cryptography (the Tesla approach) security is projected through randomness and the variety of key, without any reliance on mathematical complexity. It is therefore that so much entropy boosting is needed.

On top of this boost in entropy, the elusive key is used in part only when it is invoked to perform encryption (and of course decryption). A message, a plaintext, is a sequence of plaintext letters. Let P be the alphabet used to write the plaintext comprising n letters $p_1, p_2, \ldots p_n$. Each of those letters is written as a sequence of bits. We now assign a plaintext letter (one of the n) to each and every vertex that appears in a randomly constructed key skeleton, where a key skeleton is the construction of vertices supported by edges before any of the vertices and any of the edges was assigned any letter. Suppose now that every vertex is connected through an edge to at least one vertex marking an arbitrary plaintext letter. In other words, each vertex will have to be connected to at least n other vertices where the variety of letter assignment to these vertices is such that any arbitrary letter from the n letters is connected with an edge from the vertex we analyze (the subject vertex). We call it the simple travel continuity requirement of the key. A key that complies with this simple travel continuity requirement (STCR) can be used to map any message written in the P alphabet to a pathway on the elusive graph. And that regardless of the size and shape of the key, since a pathway can repeat upon itself as often as one wishes. Nothing more than the STCR is needed in order to render the elusive key we use here to be a fully functional key for any plaintext message. We now come to extend the simple travel continuity requirement to a less stringent requirement. We define a letter zone as a set of vertices that are marked with the same letter and allow one to move from any vertex of the zone to any other vertices through the edges among these vertices, namely to move from one vertex of a particular letter to another vertex of that particular letter which is part of the letter zone, without in between going through a vertex of a different letter. The simple travel continuity requirement is now relaxed to apply for a zone as described above. So a particular vertex may not have a direct edge pointing to some other letter, but another vertex of the same letter zone does have an edge to that other letter, and thereby the travel continuity requirement is fulfilled, this is the relaxed, or the nominal travel continuity requirement NTCR. Any so marked plaintext pathway (by list of visited destinations) is equally defined by listing the edges on which it traverses. Given the starting vertex of any plaintext message (pathway), and given a well-defined sequence of the edges over which the pathway moves along, it is possible for anyone with possession of this elusive key to take the list of traveling edges and convert it to the list of traversed vertices, namely convert it to the plaintext message. We need to add the limitation that two edges emanating from a given vertex will not be marked by the same ciphertext letter, to avoid confusion. What makes all this very interesting is the fact that anyone without possession of the map (the elusive key, the Rock) is totally clueless as to the identity of the plaintext message. In other words, the elusive key arrangement defines a cipher. The basic concept is well defined: mapping a plaintext to a pathway on a graph by following the list of destinations (letters marked vertices) listed in the plaintext message (a sequence of plaintext letters). Then describing the same pathway by indicating the starting vertex and listing the traversed edges. The identity of the starting vertex and the list of edges (written as a sequence of ciphertext letters) amounts to the ciphertext corresponding to the encrypted plaintext. One accomplishes the task of encryption with identifying the starting vertex and listing the edges comprising the ciphertext. The recipient of the ciphertext, if they are in possession of the same key can start with the starting vertex, mark the pathway with the list of traversed edges and read from the graph the plaintext letters by order—the plaintext message. This is the corresponding decryption. The encryptor (the one who encrypts) can take a long message stream, break it down to slices, map each slice on an arbitrary pathway with an arbitrary starting point, send off the corresponding ciphertext, and then proceed with the next slice of the plaintext stream, again, choosing another arbitrary starting vertex and an arbitrary pathway—as long as it lists the destinations identified in the plaintext message. So each slice of plaintext is encrypted with an arbitrary part of the key. This key interaction is fundamentally different from what is common. In virtually all ciphers the full key is engaged in encrypting any slice of plaintext. Here every slice of plaintext is encrypted with a different section of the key. A section unknown to the attacker. It is not clear to what extent these pathways intersect, or to what extent they are separate because the cryptanalyst has no idea how big the key and how is its structure formed. At some point of usage, one would argue, the entropy diminishes and there are fewer and fewer possible maps (keys) that would fit a long series of ciphertexts to sense making (plausible) plaintexts. Alas, since the size of the key is unknown, the cryptanalyst will never be sure that a key that corresponds to plausible interpretations of all known ciphertexts, is not but a subset of the actual key that keeps previously unused key material, to be used in the next encryption. We will see soon how to remedy this asymptotic trend to brute force attack strategy. It is clear though that since the starting point for each path and its structure are arbitrary, they can be randomly selected and thereby accomplish a pattern devoid encryption and decryption. Since there is no pattern to discover there is no fear from anyone smart enough to somehow dig a hidden pattern—there is nothing to dig out! Not in the key, and not in the arbitrary locations of the arbitrary pathways of encryption/decryption on the key. We will argue that the elusive key is secure even if all non-randomized parameters are well known to the attacker.

We summarize the basic concept: the "Walk" elusive key is a graph comprising of v vertices and e edges, where each vertex is assigned a letter from a plaintext alphabet, P, and each edge is assigned a letter from an edge alphabet, E. The elusive key, the map, subscribes to the travel continuity requirement and hence any plaintext message of any size may be mapped onto a path within the key. The marked path may be described by indicating the starting path vertex then providing the sequence of traversed edges. The edge-wise description of the plaintext sequence is regarded as the ciphertext of the elusive key cipher. A recipient of the ciphertext together with indication of the starting vertex will be in a position to mark the path on the same elusive key and then read from the key the corresponding plaintext message. This is the action of decryption.

The above is a conceptual description of this elusive key cipher. It has all that one needs to assess the power of the key and its main features:

1. The elusive key will encrypt any message of any size written in the plaintext alphabet and generate a ciphertext, which can be unequivocally reversed with the help of the same key.
2. A stream of plaintext may be divided to arbitrary slices and each slice in turn may be independently mapped to its corresponding ciphertext. The sequential ciphertexts will be decrypted in turn to regenerate the original plaintext message.
3. Each plaintext slice may be mapped to a pathway starting with an arbitrary vertex marked with the first letter of the slice.
4. The elusive key, the map, may be built such that various vertices will have several vertices with which they are connected with an edge and where each of those several vertices is marked by the same letter. This will allow the mapping process to arbitrarily depict a next vertex from the several vertices who share a plaintext letter. Since all the edges emanating from the same vertex are distinctly marked, the decryptor will be able to reverse the particular ciphertext to the right plaintext. In other words, as built, the plaintext may be encrypted to several ciphertexts and all those ciphertexts will decrypt to the same plaintext.
5. No amount of use of the elusive key cipher will allow its observer to conclusively determine the content, the size, the shape, the structure of the entire key, so no conclusive brute force cryptanalysis. This is because at any stage of use the key may include parts that have not been used before.
6. The arbitrary nature of the size, the shape, the structure of the key and its contents, and then the way the plaintext stream is being divided to sequential slices and the determination of where (which vertex) to start the pathway as well as exercising degrees of freedom to decide on the exact trajectory of the pathway—all these arbitrary decisions may be subjugated to randomization and thereby result in a pattern devoid cipher, which means a cipher not vulnerable to a smarter mathematician and a better equipped adversary to find a hidden pattern. This equivocation together with lingering doubt as to the size shape, structure and content of the key—defy any chance for a conclusive brute force analysis. We say then that the only viable cryptanalysis is brute force and that one is inherently non conclusive.
7. The selection of the key with its parameters is shared randomness between the encryptor (the one who encrypts) and the decryptor (the one who decrypts); the slicing of the plaintext and the mapping process on the key is unilateral decisions (randomized or not) determined by the encryptor. They don't confuse the intended reader (the decryptor) of the ciphertext but do pose a cryptanalytic barrier before the cryptanalyst.
8. The elusive key cipher is fitted with a procedure designed to implement at will ciphertext dilution. It works as follows. The original plaintext alphabet is mapped into an elusive cipher alphabet L comprising (n−1) letters, where n is a positive integer where n>3 and k=log(n) is also an integer: $l_1, l_2, \ldots l_{n-1}$. These (n−1) letters are expressed with strings comprising k bits. When an arbitrary plaintext message, M, is written in the elusive cipher alphabet, there are occurrences where two successive letters are the same, $l_i$ followed by $l_i$, for i=1,2, . . . (n−1). Every such occurrence is treated by a previously unused letter $l_n$ which is injected into such letter repetition, so that:

$$l_i\text{-}l_i \rightarrow l_i\text{-}l_n\text{-}l_u$$

Such treatment generates a plaintext message written with n letters of alphabet $P=L+l_n$, and this sequence of letters has no letter repetition. We call it an EK-ready plaintext message M. One can always pluck out all the occurrences of letter $l_n$ and recover the L written plaintext and from there back to the original plaintext. On the other hand one could arbitrarily create repetitions of any letter in the M sequence to increase its size at will, resulting in M*. A recipient of this enlarged message, M*, will readily collapse it to its M size by eliminating all the letter repetitions. This procedure allows the message encryptor to enlarge the encrypted plaintext at will before mapping it into a pathway on the key. The result will be a long ciphertext. The longer ciphertext will not confuse the intended recipient who will use the key to map the ciphertext (edge sequence) back to plaintext (vertices sequence) and then perform the repetition elimination and collapse the plaintext to its original size, M. Alas, the cryptanalyst who is not in possession of the key will not have any means to properly collapse the ciphertext and will have to treat every part of the ciphertext as contents bearing. This mechanism will allow the encryptor to ramp up cryptanalytic difficulties at will before the cryptanalyst. There is no limit to how much larger the inflated ciphertext can be. The greater the inflation the greater the security. This conceptual description of the cipher will be implemented via additional limitations as described ahead.

2.1 Scaffolding Construction

A limiting way to implement the elusive key cipher is with the use of a geometric platform serving as scaffolding. A scaffolding is a multi dimensional register. A register is a linear assembly of small data containers denoted as "bins". The data containers (bins) normally contain a bit or a few bits representing symbols. In a physical embodiment the bins contain material ingredients. These bins, containers, are envisioned as squares, or cubes, or units of a chosen dimensionality. All their dimensions are of unity length. The bins are adjacent to each other, An n-cell register is a line of n squares, each square may contain data. Note: this abstract description of the scaffolding may be relaxed to different measurements, especially for physical embodiment. We now cast the squares as vertices, and the contact area between two adjacent squares we cast as edges. In a one dimensional setting the travel continuity requirement can only hold for an alphabet of two letters (binary), and in that case the key will resemble a normal bit string key. What is important is that the so defined register is carved out of a two way infinite stretch of such squares which serve as a scaffolding for the construction of the register. In the register expression of the graph as described, the squares from 2 to (n−1) each have two edges extended from it: right (R) and left (L) to their two adjacent squares. The n-th square has only the left (L) edge defined, towards square (n−1). We therefore define a virtual edge, regarded also as 'right' (R) as an invisible one that connects square n (vertex n) to square 1 (vertex 1). So now square n has also two edges, L and R. The 1st square has only one (the Right 'R') edge defined, towards square 2. We therefore define a virtual edge, regarded as 'left' (L), as an invisible one that connects square 1 (vertex 1) to square n (vertex n). So now square 1 has also two edges, L and R. With these two virtual edges we achieved unity of form, every vertex has 2 edges, R and L. One can now travel through the register in each direction in a circular fashion.

2.1.1 2D Extension

We now extend the scaffolding into a two dimensional grid, on which we may define two or more linear registers as above. If the registers have adjacent bins such that from every bin it is possible to hop bin to bin to come at any other bin in the assembly of bins then this assembly of registers may be regarded as an elusive key in two dimensions since every square (vertex) has a path (through adjacent squares) to any other square (vertex). In such a two dimensional key situated in a two dimensional grid (scaffolding) we have squares (vertices) that have four edges extended from them: right, left, up, and down or say R, L, U, and D representing the four possible adjacencies. We extend the concept of virtual edge from the one dimensional case to the two dimensional case, to wit: if a square has no adjacent square in the key in any of the four adjacency directions, then one is drawing a line on the grid in the opposite direction and stops this line at the square (bin, box, vertex) which is the furthest (on the key) from the square from which the line is being drawn. That furthest square is deemed to have a virtual edge leading to it from the square from where the line is drawn. The direction of this virtual edge, is the direction of the missing edge. It replaces it. Since there is always a furthest square (even if the from-square and the to-square are one and the same), this definition of virtual edge is well stated, and always identifies the from and to of an edge. One may notice that a virtual edge, (as these edges are called) unlike a non-virtual edge, is not symmetric. Namely square x may have a virtual edge, in, say, direction 'Up' pointing to square marked y, yet square y pointing to direction 'Down' may identify a different square z x as the square pointed to by its virtual edge. The virtual edge arrangements prevents any ciphertext expressed as a sequence of edges: U, D, R, L from leaking information as to the size, or the shape of the key, nor to the placement of the path on the key.

2.1.1.1. Diagonal Edges

The 2D implementation may be exercised with 8 edges per square rather than 4. This is done by including the four squares which are diagonally related to a subject square. These 4 diagonally related squares share each a point of contact with the subject square. See fig-7. We can identify the 8 directions analogously with the designations of directions on a nominal geographic map:

north, north-west, west, south-west, south, south-east, east, north-east or say:

A, NW, W, SW, SE, E, NE

The virtual edge is extended to the diagonal edges. If for any direction there is no diagonally adjacent square, then one draws a line on the opposite direction, and identifies the square of the key which is the furthest from the square from where the line is drawn, and then sets a virtual edge leading from the subject square to the square which is the furthest from it. It is regarded as extended from the missing non-virtual direction. Much as before, the virtual edge is not necessarily symmetric. If square A has no square on the key in direction NE, then a line in direction SW (the opposite to NE) identifies square B as the one furthest on the key, and then, the edge NE leads from A to B. It is clear that square B has no adjacent square in direction SW, but when the virtual edge procedure is applied then B may have an SW pointing to A, but it may not. There may be another square C who also points to B on direction NE, and when B points to SW it points to C.

We recall that the key is the collection of squares (bins) populated with data (bits).

2.1.1.2 3D Extension

The key scaffolding (the grid) may be extended to three dimensions, 3D, with the 2D keys are laying one on top of the other. They don't have to be congruent. In a 3D grid the vertices are placed not in squares, rather in cubes (the bin is a cube). We can define edges from each cube (vertex) to the 6 cubes with which the subject cube shares a flat surface, and call them:

Up, Down, Right, Left, In, Out (U,D,R,L,I,O)

And apply the virtual edge arrangement to all the dimensions. Alternatively, one may define edges relative to all the 26 cubes that share a surface, or a line or a point of contact relative to a subject cube. The virtual edge arrangement will apply to all the directions.

2.2 Key Sequencing

The elusive key K comprising k vertices is associated with two types of sequencing which line up the k vertices in a particular order; (i) objective sequencing, and (ii) subjective sequencing; the first is an order that is agreed for the key and under which every vertex is assigned an order marker o ranging from 1 to k: $1 \le o \le k$. The second class is a sequence that may assign every one of the k vertices the order count 1, and all the other (k−1) vertices are put in order according to the choice of vertex 1. The objective sequencing may be a subjective sequencing based on a-priori agreed upon starting bin.

2.3 Key Entropy

A normal key in the form of a bit string presents entropy through the $2^n$ possible strings for an n size string. An elusive key, K, comprising k vertices presents entropy on account of its $n^k$ possible layouts where n is the number of letters in the plaintext alphabet, P. However, the elusive key affects the encryption not only through the identities of its k vertices, but also through its geometry and configuration. Say then that one may be aware of the identities of the k vertices, and still face daunting entropy on account of ignorance as to how these k vertices are being arrayed. In a higher dimensionality key, this entropy is higher. It has been shown how the virtual edges impact the 'travel path' by 'tossing' the path to the opposite side of the key. The only requirement of the key as it is arranged on the scaffolding is that from every vertex it would be possible to go to any other vertex through the established edges. This allows for 'holes' inside the key. Holes create situations for middle vertices to be applicable for virtual edges, with the added entropic impact they entail.

The advantage of geometry bearing impact is that given a shared key, the communicators can modify it in the open with minimum leakage. Example: the communicators can say to each other in the open: shift the contents of the k vertices some q steps forward, based on the subjective sequence of the key vertices as counted from vertex x, where x is counted on the objective sequence of the vertices. This means that vertex marked as vertex x+q in the subjective order started with vertex x will assume the identity of vertex x, and vertex x+q+1 on the same subjective order will assume the letter identify of vertex x+1, and so on, a shift of identities throughout the key. The attacker who is unaware of the geometry of the key faces the unknown geometry of the key.

There are many other simple geometry changes. For example, for a 2D key, take the rightmost column off and paste it as the leftmost column. Similarly for rows. Several such changes can be combined. This changes are clear only to the party that is aware of the geometry of the key to begin with.

2.4 Key Construction

The "Walk" methodology key construction is similar to the Rock methodology key construction, details there. An important distinction between the Walk key and the Rock key is that the Walk key has to abide by the zone oriented travel continuity requirement, while the Rock key can be fully randomized. We have seen that by including diagonal edges and increasing the dimensionality we can reduce the limitation of the travel continuity requirement, yet it would not be zero, and so one needs to use a compliance imposing procedure on a randomly constructed elusive key used for the Walk methodology.

2.4.1 Travel Requirement Compliance Imposing Procedure

We start with a totally randomized elusive key, K. It has k vertices (bins), the identities of which and their locations was determined through a good randomization source. The procedure then calls for randomly selecting a subjective sequence of the k vertices, such that each vertex has a connecting edge to the vertex before it on the sequence and an edge towards the vertex ahead of it on the sequence. Second the procedure checks compliance for $k_1$ on the selected sequence. If there is no compliance, then compliance is checked for the next vertex in the sequence. And so on until at some value i, vertex $k_i$ is compliant. If a compliant bin is not found then one re-randomizes the key and tries again until compliance is found for at least one key.

Vertex $k_1$ is marked with plaintext letter $p_1$, and is travel requirement compliant. One then checks $k_2$. If compliant then onward to check $k_3$ and so on. At some point a vertex $k_l$ where there may be no compliance. When this happens the letter identity of $k_l$ is changed to the letter identity of $k_{l-1}$, and thereby k, becomes compliant. Once so the inspection continues to $k_{l+1}$, and $k_{l+2}$, and on, through $k_k$ If the inspection of the bins through all the them, involved a case of changing identity of a vertex to the identity of the one before, then the procedure calls for going over the k vertices again. The re-inspection of the k vertices as above will continue again and again until such time when the full round of inspection from 1 to k encountered no occasion for changing any vertex identity. Once this state is achieved, then the original non-compliant elusive key becomes a fully compliant elusive key. The procedure as described creates larger and larger travel requirement zones throughout the key and hence these rounds are bound to end up with a round without any addition identity conversion.

2.5 Choice of Alphabets

The travel continuity requirement over the key, imposes a limit on the size of the plaintext alphabet. The larger the alphabet, the larger will have to be the single letter zones. By adjusting the sizes of the single letter zones it is possible to keep the count of letters in the vertex (plaintext) alphabet, P, independent of the count e of letters in the steps (edges), ciphertext alphabet.

There are various arguments for setting the plaintext alphabet to be of 4 letters count. So each letter will be described with 2 bits. The ciphertext alphabet may be set to count 4 letters, in case for 2D key where only line-connecting squares have a joining edge, or it may be set to a count of 8 letters, in case the diagonally aligned squares are also considered to be edge connected. For 3D keys, if only surface connected squares are considered to be edge connected then there are 6 letters in the ciphertext. If all the surrounding squares connected either with a surface or with a line are counted then the ciphertext will need 18 letters. If all the surrounding squares are considered to have an edge, even if the contact is a point then one will require 26 letters for the ciphertext. For N dimensional key the number of edges is $3^N - 1$.

For a plaintext alphabet of 4 letters {X, Y, Z, W} and a 4 edges per square then the chance for a square not to comply with the travel continuity requirement will be: $Pr=(3/4)^4=32\%$ and the chance for a couple of same letter connected squares not to be travel continuity compliant is: $Pr=(3/4)^4*(3/4)^3=(3/4)^7=13\%$ which is substantial and the key will have to be modified to upgrade it to travel continuity compliance. If, on the other hand, we take diagonal edges into account then the corresponding figures are: $Pr=(3/4)^8=10\%$ for the chance for an arbitrary square not to have the desired letter as neighbor. and for two adjacent squares of the same color: $Pr=(3/4)^8*(3/4)^7=(3/4)^{15}=1\%$

2.6 Illustration

[See FIG. 14] Alice and Bob agree on a 46 vertices Elusive Key cipher, constructed with a random shape on a 2D scaffolding. FIG. 14 (1) shows a starting snail sequence of the 46 bins of the key. The plaintext alphabet is selected as 4 letters: X, Y, Z, W where the plaintext messages have no repetition. The ciphertext alphabet is 8 edges: E, NE, N, NW, W, SW, S, SE. The selected key is populated randomly with the 4 letters of the plaintext alphabet.

Alice wishes to send Bob a message: "Our code is: 84728". Converting to Base64 the message looks like this: M=T3VyIGNvZGUgaXM6IDg0NzI4 Alice slices M randomly to 3 sections: $M_1$=T3VyIGN, $M_2$=vZGUgaXM6ID, $M_3$=g0NzI4, where M=$M_1$∥$M_2$∥$M_3$ The alphabet conversion table indicates:

$M_1$=T3 V y I G N=XYYX ZXXX YXZY ZZYXIZZX YXYY ZXYX

Alice then injects W between any pair of repeating letters:
$M_1$=XYWYX ZXWXWX YXZY ZWZYX ZWZWZX YXYWY ZXYX Alice divides $M_1$ to a randomized number of sub-slices:
$M'_1$=XYWYX ZXWXWX; $M''_1$=YXZY ZWZYX ZWZWZX; $M'''_1$=YXYWY ZXYX where $M_1$=$M'_1$∥$M''_1$∥$M'''_1$ The $M'_1$ slice is now ready to be mapped on the key. We illustrate here a situation where by arbitrary convention the letter W is entered at the beginning of each slice:

$M'_1$=W XYWYX ZXWXWX

Alice now wishes to select a starting point for her travel path to be determined by M' 1. She does so by counting bins on the agreed upon snail sequence which is shown in FIG. 14 (1). The counting is defined on the basis of knowledge of the key, so that only the recipient will be able to know at what bin the travel path that draws $M'_1$ is starting. Alice invokes a randomness source that yields the number u=10, and then she counts on the snail sequence 10 occurrences of a bin marked with the letter W. W appears on the following bins: 1, 2, 3, 12, 13, 14, 16, 17, 18. So on bin 18 is the $10^{th}$ occurrence of the letter W. This bin (18) then becomes the starting point for the travel path to be marked by $M'_1$. Alice will pass these instructions (the $10^{th}$ occurrence of W) to the recipient who will also be able to identify bin 18 as the bin where the travel starts. A third party not holding the key would be unable to identify bin 18 as the starting bin. Vertex 18 then becomes the anchor for mapping of the sub slice $M'_1$=W XYWYX ZXWXWX onto the key. Since the key is travel requirement compliant $M'_1$ is mappable on it. The mapping encountered two occasions wherein the virtual edge procedure was used. As it is shown $M'_1$ is mapped into a pathway beginning with the anchor vertex, number 18, See FIG. 14, identified with the following edges:

C=SW, S W, SW, SK S, SW, SE, N, N, N, NW, W, W, S, W, W N, SE, S, S, SW

The ciphertext $C'_1$ is inflated relative to its generating plaintext $M'_1$. The latter is comprised of 12 plaintext letters, expressed with 2 bits each, a total of 24 bits; the former is comprising 22 ciphertext letters (edges) expressed each with 3 bits each, logging a total of 22*3=66 bits. An inflation at a ratio of 66/24=2.38 fold. Alice then passes to Bob (i) $C'_1$, (ii) the value u=10 for Bob to count 10 appearances of W to spot bin 18 as the bin where the travel starts.

Bob identifies vertex 18 as the travel path starting point (anchor). He then applies the sequence of edges sent to him from Alice (the ciphertext) starting at bin 18. The travel path identified by the edges, reveals the visited bins (vertices): The result:

P*=W X Y W Y K X X Z X X X X K W W W W W K X W W W X which Bob readily collapses to:
P'=W X Y W Y X Z X WX W X Bob them pulls out the 'W' letters, resulting: P=XYYX ZXXX which translates to the first two letters {T, 3} in the Base64 expression of the plaintext section $M_1$=T 3 V y I G N. Similarly the rest of the $M_1$ message will be encrypted by Alice and decrypted by Bob, and then converted to the original text: "Our code is: 84728".

3.0 The "Rock" Route

Below is a presentation for the use of the Elusive Key by the Rock method of encryption.

3.1 Introduction to Rock Cryptography

The term "Rock" is derived from "The Rock of Randomness" which is a technology for capturing data off the digital realm. This technology is adapted to the Elusive key together with an encryption methodology distinguished from the "Walk" encryption described before. The idea of embodying the cryptographic key in a lump of material imposes restrictions on the size of the key. For the Walk methodology of encryption the randomness of the key is reduced on account of the necessary compliance with the travel continuity requirement, which is compensated by enlarging the key. The Rock methodology does not impose the travel continuity requirement. It also does not require the no-repetition plaintext messaging, which further simplifies it. Rock encryption is straight forward. Plaintext letters are passed from the transmitter to the recipient one by one. A given plaintext letter p is passed by identifying an anchor bin A, then "snail sequencing" all the bins in the key with respect to A, and counting s steps from A on the snail sequence to reach a bin with content p. All that is needed is for the transmitter to pass A and s to the recipient. The transmitter does so by giving the recipient information that requires the possession of the key in order to interpret it as the anchor bin and the number of steps to the marked bin. There is great degree of freedom in selecting ways to specify A and s based on knowledge of the key. These ways do not have to be pre-coordinated with the recipient. They just have to be clear, specific so they can be followed accurately by the recipient. This degree of freedom opens the door for AI and rich human creativity to pass the values of A and s.

It is clear from this description that unlike the Walk method which passes a series of letters in an exchange, in the Rock method the transmitter passes one letter at a time to the recipient. If the pointed-to marked bin is not marked with any letter from the plaintext alphabet P, then this information (A, s) is considered decoy and is ignored. This feature allows the transmitter to 'drown' the content-bearing ciphertext with at will amount of content-free, randomized data that is readily distinguished by the recipient and inherently confusing to the attacker.

Bins are identified based on a reference snail curve, and where the count can be unequivocally specified in many ways. For example:

1. From a known bin go along the anchor-based snail curve and stop at the bin where the letter of the anchor appears on the snail sequence on the 12th time. Make this stop the next anchor.
2. From a given anchor find the first bin marked by plaintext letter p, where the count of the bin is a prime number relative to the anchor based snail sequence; from there take 7 more step to the bin that contains the next letter on the plaintext message.
3. Find the 3rd occasion where three consecutive bins on the anchor based snail sequence appear next to each other, and count 12 steps further to hit the bin that is marked by the next letter of the plaintext message.

This is where AI can come in, to surprise with ever new ways to communicate the anchor point and the steps count on the basis of knowledge of the Rock. Everything comes back to the Rock, and to the extent that the Rock is zealously randomized, so is the cipher. A library of possible ways to identify anchor and step counts based on knowledge of the key will be made public, and transmitters will resort to this library to randomly select the next way to specify A and s (anchor and step count). This strategy will destroy any attempt to deduce pattern, and it will further reduce the chances for the cryptanalyst to build the key gradually. While every instant of encryption relies on parts of the key, that part may be made as big as the whole key.

3.2 The Physical Rock

We start with the conductivity based Rock: The idea: to construct a Rock of Randomness ("Rock") from same size cubes where each cube is built from material of conductivity $c_i$ where i=1,2, ... n, where n is the number of letters $p_1$, $p_2$, ... $p_n$ of a chosen plaintext language P. The cubes are considered bins, boxes, elements of a scaffolding for the elusive key. The conductivities need to be distinct and identified in measurements. Namely $c_i \neq c_j$ for $i \neq j$. The bins are sequenced through a first snail (objective) sequence, $o_1$, $o_2$, ... $o_k$ where the elusive key K is comprised of k bins, and they are also sequenced in k subjective keys based on each of the k bins being assigned as number 1 in this subjective order and from where all the (k−1) bins are sequenced: $s_1, s_2, \ldots s_k$. (the "snail" sequence).

The Rock is a technology specified in the following U.S. Pat. Nos. 10,467,522; 11,062,279; 11,548, 309 where a lump of matter is assembled from n ingredients of varied electrical conductivity. In this application we further limit the assembled ingredients to fit in shape into bins of a multi array scaffolding. These are squares in two dimensional rock and cubes in three dimensional rocks, etc.

The n ingredient, elements of the rock are each with unique (identifiable) electrical conductivity. The Rock in this application features means to identify the material ingredient that occupies each bin. The identification is accomplished through measuring the electrical conductivity of the material in each bin. Each of the n distinct ingredients of the rock represents one letter in a plaintext alphabet. So if the rock comprises n distinct conductivity-unique elements then it may be used to support a plaintext comprising n or fewer letters in its alphabet.

The Rock, which functions like the cryptographic key, comprises k bins where k>n so any given letter $p_i$ for i=1, 2, ... n in the plaintext language P is 'written' on average in k/n bins on the Rock.

The transmitter is sending the recipient a message written in plaintext language P, letter by letter. To send to the recipient letter $p_i \in P$, the transmitter sends to the recipient location instructions (LI) to point to the identity of a bin containing the conductivity-specific material corresponding to $p_i$. These location instructions are well interpreted by any party in possession of the Rock, and cannot be interpreted by any party not in possession of the Rock. Thereby the recipient receives the message M written in language P.

The location instructions are generated through random input to ensure this encryption is pattern devoid. The users may choose to express the plaintext messages with an alphabet of size n* letters, where n*<n. In that case the transmitter could mix into the instructions for the letters of the transmitted messages, any number of location instructions pointing to the any of the (n−n*) conductivity-specific ingredients that do not represent any letter of P. The recipient, when realizing that the pointed-to bin contains a material that represents no letter, is ignoring this information, but the attacker, not in possession of the Rock cannot tell what is 'fake' (decoy) and what is real (pointing to a letter in P). Thereby the transmitter may dilute the ciphertext to any desired degree. The ciphertext is the sequence of location instructions for the series of letters in M mixed with any number of location instructions to non-letters bins in the key.

We will address (i) key(Rock) features, (ii) Location Instructions, (iii) The Rock Elusive Key Apparatus, (iv) Simulated Rock, (v) implementation considerations.

3.2.1 Key (Rock) Features

The central idea of a hardware material Rock is that the most sensitive key information is not written down anywhere in the digital realm. It is expressed through chemistry of the ingredients and the way they are assembled. Their data is read afresh every time it is being used. By not having a digital copy of the key, even its users may not be aware of its content, size, shape. As designed the material rock is extremely resistant to even persistent efforts to expose its identity.

The Rock key has the same features in terms of key size, key shape, and relationships between the bins as they are for the "Walk" key herein. These features, size, shape, content, are part of the secrecy of the Rock key.

The unique distinctive feature of the Rock key is the fact that the plaintext letters expressed or written into the various bins are embodied via a material, not a digital, entity. The k bins of the Rock key are all a square or a cube as the case may be (2D or 3D). The material chunk that represents a letter is an integral part of the key. Or say the bins are attached to each other into a cohesive lump. However, like it is with the Walk key, the key can be comprised of several lumps that are not connected, alas each lump is firmly placed into a rigid scaffolding, so that the relative geometry among the lumps remain fixed.

The Rock will be useful to encrypt any message as long as it contains at least one bin with material corresponding to every letter in the plaintext alphabet. But of course the more bins that bin are representing the same letter the greater the cryptanalytic barrier of the system, and also the more bins there are (k) the more options are there to fill them with materials that correspond to no letter in the plaintext alphabet P, and hence it is easier to practice ciphertext dilution as part of the security posture.

The identity of the materials in the bins of the Rock has to be established in order for the encryption and decryption processes to take place. We discuss ahead various technologies for bin material identification.

Rocks can be built as two dimensional constructs, 3 dimensional, or higher. We discuss ahead the question of Rock dimensionality.

Rocks can be small for personal equipment, medium or large for most serious applications. Rocks can two dimensional pictures that fit into a telephone screen. Rocks can be rugged shape on their envelope and full of 'holes' much as Walk-keys are. Rock size and shape is discussed ahead.

3.2.2 Bin Material Identification

The Rock is comprised of k bins in aggregate lumps. The bins are identified via t distinct materials, where t>n where n is the number of letters in the plaintext alphabet, P: $p_1$, $p_2$, ... $p_n$. Material (n+1) and on represent other than plaintext letters. The Rock operation is based on a quick and accurate identification of the material ingredient in each bin in the key. In that respect the requirement is quite different from the listed applications on the above-mentioned patents featuring the Rock.

Identification is much easier on two dimensional rocks compared to three dimensional or higher dimensional rocks. A four dimensional rock is created by listing in order several three dimensional rocks, and a 5th dimensional Rock is created by listing in order several 4th dimensional Rocks.

In the original Rock application the measurement of the ingredient is electrical conductivity. This is a viable metrics in our case here too. But other measurements are possible much the same. In particular 'color' or reflection capacity of electro magnetic radiation of any wavelength.

We discuss two options: electrical conductivity, and electromagnetic reading.

3.2.2.1 Electrical Conductivity

A 2D embodiment will be implemented by attaching to a Rock in shape of a plate, a measuring plate with probes adjusted as two reference contact areas per bin. Between these two probes the related electronics will apply a voltage and measure the resultant current to compute the conductivity of the material in the bin and thereby find out its identity—which letter it represents.

There are various ways in which such two contact areas may be set. They may be two points on a diagonal for the square bin, or they may be a center point for one pole, and a surrounding circle for the other pole. Such one-sided measurement will allow for two layers of 2D Rocks to be attached together and each layer will have a plate with probes and electronics attached to it.

Using one layer only the measurement of conductivity may be carried out through probes on both sides of the bin exposed as the surface of the Rock.

3.2.2.2 Electro Magnetic Reading

The obvious measurement is color, but any other electromagnetic range will do. A two-dimensional rock may be constructed as a colorful mosaic embodied on a phone screen where a second phone takes a picture thereto to share the key, or it can be printed on paper and given to a partner to photograph and use as shared key.

3.2.3 Shape and Dimensionality of Rocks

Security is upgraded as the dimensionality of the Rock climbs. Alas, measurement is a challenge. It is easy to measure one plate, one surface of Rock area with an abreast measurement plate. Two contiguous plates are measured with two enveloping plates of probes and electronics. More layers can be assembled with a measuring plate between any two layers.

The bins in the rock are of a t variety—t different measurable ingredients. t must be at least the value of n—the number of letters in the plaintext alphabet ($t \geq n$). It is advisable to have at least $t=n+2$, so that one non-letter ingredient will stand for 'empty' bin, and the other will be used to signal the end of an encrypted sequence. If we have $t > n+2$, then these ingredients can be used to generate an inflated ciphertext. These so-called 'decoy' bins may be used as 'letter look alike' in the encrypted sequence. The Rock holder will not be confused, the attackers will be.

Let D be the decoy ingredient, and let $n=4$ where X, Y, Z and W be the letters for the plaintext alphabet so that every letter in the 64Base alphabet will be expressed as a combination of 3 of these four letters. Let ingredient T be an indication that the encryption sequence has come to its end, terminated.

Illustration: Let the transmitter wish to send message M=XXYWZYXW to the recipient. The transmitter will send to the recipient anchor bin information and step count information for the following letters in sequence:

M*=XDDDDXYWZDDDDDDDDDDYXWT

The recipient will receive M* letter by letter, then chop off T, remove the decoys and read M.

The empty bin will be represented by a distinct material and will be interpreted as "holes" in the rock. We have seen the advantage of holes: they alter the subjective sequencing of the bins in the key.

The empty bins will also be used to indicate a rugged, irregular shape for the key as a whole.

3.3 Location Instructions

The essential idea of the Rock encryption of the elusive key is that the transmitter passes to the recipients instructions how to locate the bin which includes the next letter in the encrypted message. And these location instructions are based on knowledge of the key so that only the key holder can interpret them properly. This is different from the "Walk" version of the Elusive key in which the transmitter passes to the recipient the travel path that represents the plaintext message, only that this travel path is expressed through the travel roadways as opposed to sequence of destinations. The recipient holding the key can translate the road-language to destination language. The Walk version requires for the key to abide by the travel continuity requirement which limits somewhat the randomness value of the key (less entropy), while the Rock version allows for the key to be fully randomized, no need to abide by the travel continuity requirement. And hence the Rock key can use a much larger alphabet and pack more entropy in a smaller volume. A key feature of the location instructions is that they are randomly determined in many ways.

3.3.1 Location Instruction Procedure (Basic Version)

Let M be a plaintext message the transmitter wishes to transmit to the recipient with whom they share a Rock elusive key, K. $M=x_1-x_2-\ldots x_t$, where $x_i$ for $i=1,2,\ldots t$ are the letters that comprise M, and where $x_i \in P$, P being the plaintext alphabet for $i=1,2,\ldots t$.

Let $O=\{o_1, o_2, \ldots o_k\}$ be an agreed upon objective order of the k bins of the key K.

The location instruction procedure is prepared by the transmitter using a source of randomness, R. Preparation of location instructions has two parts: Anchor Setting, Location Setting.

The procedures outlined below are illustrative, and can be replaced by a rich variety of procedures all based on the idea that bin location may be creatively specified based on information contained in the secret key, so attackers will remain in the dark.

3.3.1.1 Anchor Setting:

1. Random pick of a pre-anchor bin, $A_0$ 1.1 Use R to pick an integer $A_0$ between $1 \leq A_0 \leq k$. (based on the agreed upon objective sequence of the key).

3.3.1.2 Location Settings:

2. Random pick of first letter anchor bin, $A_1$ 2.1 Read the identity of the selected bin $A_0$. Identity may be a letter $p_j$ of the plaintext alphabet P comprising letters $p_1, p_2, \ldots p_n$, or it may be a decoy letter D where $D \neq p_j$ for $j=1, 2, \ldots n$. For convenience we set $p_0=D$ and redefine plaintext P to include D as a letter of the alphabet that does not appear in any message written in P.

2.2 Use R to pick an integer S between two arbitrary limits $S_{min}$ and $S_{max}$: $S_{min} \leq S \leq S_{max}$ 2.3 Use the subjective sequence of the key K anchored in $A_0$ to locate the bin in which the letter identified in bin $A_0$ appears in the S-th time in that sequence. Set this bin as $A_1$ (The anchor for $x_1$)

3. Random pick of location for letter $x_i$, namely $L_1$ 3.1 Use R to pick an integer $Q_1$ between two arbitrary limits $Q_{min}$ and $Q_{max}$: $Q_{min} \leq Q_1 \leq Q_{max}$ Note: The values of $Q_1$ and S may be larger than k, since the subjective sequence of bins in the key is counted cyclically, as many rounds as necessary. Same for $Q_2$, etc.

3.2 Use the subjective sequence of the key K anchored in $A_1$ to locate the bin where letter $x_1$ appears for the $Q_1$-th time. Let this bin be assigned as $A_2$. Let $d_i$ be the number of bins between bin $A_1$ and bin $A_2$ as measured on the subjective sequence defined by $A_1$. That means, one makes $d_1$ steps to arrive from $A_1$ to $A_2$, or say $d_1 = [A_2 - A_1]_1$ 3.3. Set the location of $A_2$ to be a bin that has the letter identity $x_1$, namely $L_1$, where the value of $L_1$ must be passed to the recipient without disclosing it to any attacker. This procedure enables it by passing to the recipient $A_0$, S so the recipient identifies A1, then passing to the recipient $d_i$ so the recipient can spot $x_i$ and $A_2$ (same bin).

4. Random pick of location for letter $x_2$, namely $L_2$,

This procedure repeats the above:

4.1 Use R to pick an integer $Q_2$ between two arbitrary limits $Q_{min}$ and $Q_{max}$: $Q_{min} \leq Q_2 \leq Q_{max}$ 4.2 Use the subjective sequence of the key K anchored in $A_2$ to locate the bin where letter $x_2$ appears for the $Q_2$-th time. Let this bin be assigned as $A_3$. Let $d_2$ be the number of bins between bin $A_2$ and bin $A_3$ as measured on the subjective sequence defined by $A_2$. That means, one makes $d_2$ steps to arrive from $A_2$ to $A_3$, or say $d_2 = [A_3 - A_2]_2$ 4.3. Set the location of $A_3$ to be the bin that has the letter identity $x_2$, namely $L_2$.

The same sequence is applied $A_2 \rightarrow A_3 \rightarrow \ldots \rightarrow A_{t-1}$. Then 5. Random pick of location for letter $x_t$, namely $L_t$ This procedure repeats the above:

5.1 Use R to pick an integer $Q_t$ between two arbitrary limits $Q_{min}$ and $Q_{max}$: $Q_{min} \leq Q_t \leq Q_{max}$ 5.2 Use the subjective sequence of the key K anchored in $A_{t-1}$ to locate the bin where letter $x_t$ appears for the $Q_t$-th time. Let $d_{t-1}$ be the number of bins between bin $A_{t-1}$ and bin $A_t$ as measured on the subjective sequence defined by $A_{t-1}$ That means, one makes $d_{t-1}$ steps to arrive from $A_{t-1}$ to $A_t$, or say $d_{t-1} = [A_t - A_{t-1}]_{(t-1)}$ The ciphertext is constructed as $A_0, d_1, d_2, \ldots D_{t-1}$ 3.4. Geometrical Representation of 2D Elusive Key Rock The following definition applies to two-dimensional rocks, extendible to higher dimensionality.

A two-dimensional elusive-key rock is built onto a mathematical grid, called 'scaffolding' defined as flat array of squares, where each square is surrounded by eight neighboring squares, with four of them the subject square has a line-contact (side of the square), and with the other four the subject square has a point contact. The array is considered infinite in size in all four dimensions. Every square is associated with an address (x,y) relating to its neighbors as follows:

Square to the right: (x+1,y) Square to the left: (x−1,y) Square at the top: (x, y+1) Square at the bottom (x, y−1) Diagonal square between top and right: (x+1,y+1) Diagonal square between top and left: (x−1, y+1) Diagonal square between bottom and left: (x−1, y−1) Diagonal square between bottom and right (x+1, y−1)

An arbitrary square is assigned the address x=1, y=1, where $-\infty \leq x \leq +\infty$, $-\infty \leq y \leq +\infty$ since the array is infinite in all directions.

The squares of the array are considered bins which may be occupied with 'stuff'. For a material Rock the stuff is material, for a symbolic Rock the stuff is symbols. The occupying stuff may be any of the following categories:

Letters of Plaintext alphabet P ($p_1, p_2, \ldots p_n$) Decoy Stuff ($d_1, d_2, \ldots d_d$) Signaling Stuff ($s_1, s_2, \ldots ss$)

The nature of the Decoy and Signaling stuff will be elaborated ahead.

Bins that are not occupied by any of the above 'stuff' are considered 'empty'.

The collection of occupied bins is regarded as the Rock, or the Rock Elusive Key, or Elusive Key, or Key for short.

A key K, is defined through its k occupied bins—their content and their location on the scaffolding. The key is a secret shared between the communicating parties in order to send each other messages exposed to adversarial eyes without allowing those adversaries to expose the content of the communicating messages.

The secret of the key comprises its size (k), its arrangement on the scaffolding (the addresses of the k occupied bins), and the identity of the stuff in each of the k occupied bins.

The number of different decoy stuff, d and the number of signal stuff, s, is generally the same for all the encryption sessions where the Rock is used, so these integer values may be excluded from the claimed secrecy.

The average number for each stuff (identity of stuff) to appear on the key, K, is: k/(n+d+s). In general, Rocks are built such that k>>(n+d+s).

The Rock is associated with a Rock Operator, which is a system that can:

1. Access every bin on the Rock and ascertain whether it is empty or occupied, and if occupied what is the stuff that occupies it (it can be any of the n plaintext letters, any of d decoys and any of the s signal stuffs).
2. Identify the (x,y) address of every bin on the scaffolding
3. Given an address of a bin (x,y) the Rock Operator may examine that bin and conclude the identity of its occupying stuff.
4. The Rock Operator can perform Encryption as defined ahead.
5. The Rock Operator can perform Decryption as defined ahead.
6. The Rock Operator has access to source of high-quality randomness of sufficient throughput.

The purpose of the Rock operator is twofold: to take in a plaintext message, M, and generate a corresponding ciphertext message, C. and vice versa: to take in a ciphertext C and generate a corresponding plaintext M A plaintext message M is a sequence of letters from the plaintext alphabet P.

3.5 Key Construction

The Rock Key Construction is based on a subjective sequencing of the bins of the scaffolding. This sequencing is called 'subjective' because the sequencing of the bins is determined by the arbitrary choice of the first bin. Given an arbitrary bin of address (x,y), the subjective sequencing of the infinite count of bins will be denoted as List(x,y). For x'≠x and or y'≠y, we have List(x,y) List(x',y').

Key construction begins with an arbitrary choice of a positive integer, k, representing the number of bins in the key K. The larger the value of k, the greater the security of the system, but a larger key is somewhat more burdensome.

This value, k, is to be determined based on the appraised threat to the communicating parties, and based on the quantity of communications scheduled to be processed on the basis of this particular Rock—key.

Next the parties will pick the number of empty bins that will be mixed with the key bins. This number, $e_k$ is a very important security factor, as is analyzed forth.

Once k is selected, the parties will pick an arbitrary bin by its address, on the shared scaffolding (x,y). This pick does not require secrecy. The parties will then apply the Listing algorithm, Listing(x,y) to generate a list List(x,y) of all the bins in the scaffolding, or up to a number of bins high enough for the purpose of constructing the key.

The parties will then decide how many bins will be filled with plaintext letters, $n_k$; how many bins will be filled with decoy stuff, $d_k$, and how many bins will be filled with a signal stuff, $s_k$. We must abide by the equation:

$$k = n_k + d_k + s_k$$

The parties will then use a randomness source R to randomly pick the lot of each bin, according to the order of the List(x,y). R will determine whether each bin in turn will become a letter of the plaintext alphabet P, or whether a decoy letter, or perhaps a signal letter, and the last possibility is for a bin to be empty. R will pick the lot for each bin respecting the values $n_k$, $d_k$, $s_k$, $e_k$ such that the chance for a bin to be a letter is:

$$n_k / (n_k + d_k + s_k + e_k)$$

and a chance for a bin to be a decoy will be:

$$d_k / (n_k + d_k + s_k + e_k)$$

The chance for a bin to be signal will be:

$$s_k / (n_k + d_k + s_k + e_k)$$

And the chance for a bin to be empty will be:

$$e_k / (n_k + d_k + s_k + e_k)$$

This randomized picking continues throughout the List (x,y). As soon as $n_k$ bins have been picked—no more picking is done for letters. Similarly, as soon as $d_k$ decoy bins have been picked, no more picking is done for decoy option. Similarly for signal and empty bins. This process ends when the allotted number of bin types has been assigned ($n_k$, $d_k$, $s_k$, $e_k$)

Once the type of bins was assigned, then the selection of the particular type is proceeding, also randomly. The parties go through all the bins assigned as letter bins and for each of those bins R selects one letter from the list $p_1, p_2, \ldots p_n$. Note: there are some reasons to modify the flat randomness for letter selection to accommodate for the frequency of use of each of those letters in the language expressed with the alphabet P. The key builders may incorporate such reasoning at will.

Similarly for the decoy bins, which of the various d decoy options to choose for each bin is selected randomly.

Same for signal options over the s possibilities. No such selection for the empty bins—they are all the same.

Given that $n_k$ is selected to be much larger than n, there is no much risk that once populated as above, that any letter of P will not be represented. But if this happens, the parties will repeat the same process again, perhaps with a larger value for $n_k$.

As described the key K is constructed by randomized determination, so any set of so constructed keys will not show any pattern that may leak or help any attacker.

The randomization process proceeds on an arbitrary sequence on the 2D grid. It stops when k bins have been assigned content, and $e_k$ bins have been set as 'empty'. Each of these $k+e_k$ bins could have been assigned any of the following options: $n_k$ plaintext letteres, $d_k$ decoy letters, $s_k$ signal letters and one empty option: $n_k+d_k+s_s+1$ which computes to:

$$|Key| = (n_k + d_k + s_k + 1)^{(k+e_k)}$$

If the Rock is applied to the 64 letters in Base64 (n=64), and even a minimum of $d_k = s_k = 1$, with $e_k = 0.5k$, we have:

$$|Key| = 67^{1.5k}$$

We must ensure that k>n, so picking k=100, we have $$|Key| = 67^{150} 8^* = 10^{273}$$

which is infinity in any practical measure, given that the number of stars in the universe, or the number of grains of sand on all beaches is about $2*10^{23}$.

Using a smaller alphabet, say n=8, $s_k = d_k = 1$ we may pick a very small k=24, yielding:

$$|Key| = (8+1+1)^{1.5*24} == 10^{36}$$

The fact that the Elusive key is not a plain bit string but a geometric entity allows for very few bins to project an enormous amount of entropy.

The choices for n, k, $n_k$, $d_k$, and $s_k$ are wide open and are governed by a list of considerations some of them are discussed ahead.

Unlike the "Walk option", here in the Rock there is no limitation on the randomization process 3.5.1 Key Parametric Considerations The size of the key, k (number of non-empty bins in K) is the first and most important key parameter. And the most important parameter in terms of security. Next is the number of 'mixed in' empty bins, $e_k$. The more empty bins the greater the entropy. There is a wide range between the extremes. On one hand the case of $e_k=0$, generates a tightly lumped key with k bins. On the other hand, a deluge of empty bins creates a spread of non-empty bins which are largely removed from each other. Maximum entropy is generated from a lump of a key that is holes ridden like a sieve, and that is why a value of $e_k=0.5$ makes sense.

An interesting consideration arises with respect to the decoy letters. The number of distinct decoys, d, is immaterial for the security of the key, but the number of decoy bins, $d_k$, is material. On the other hand, decoy letters can serve as a plaintext alphabet for a parallel message to be extracted from the same key processing the same cipher message. Suppose one sets $n_k = d_k$. The distinct decoy letters are set to match a different plaintext language P': $p'_1, p'_2, \ldots p'_n$:

$$d_i = p'_i \neq p_i$$

We envision here two message decryptors, D and D', (message interpreters), each connected to the same transmitter T. Both decryptors use the very same Rock-key. However for D the letters of P are visible on the Rock, but all $d_k$ decoy letters are seen as decoys, so when pointed to by the ciphertext sent by T, they are all discarded. D thus interprets the cipher C as message M sent by T for his or her attention. Decryptor D' holds the same Rock key, only that the letters envisioned as decoys for D, look as letters from P' to D'. And all the letters that were interpreted by D to decipher the C to M, are seen as decoys by D'. As a result, D' decrypts C to message M'≠M.

In summary, transmitter T prepared one ciphertext C and shares the same Rock key with two recipients D, and D', sending to each of them a message that is not readable by the other despite the fact the two recipients share the same key and interpret the same ciphertext.

One can increase at will the number of decoy letters each decryptor sees and thereby pack into a single ciphertext, interpreted by the very same key any arbitrary number of parallel messages, each properly received by their target reader and no other.

Of course, a single reader may be equipped with two or more alphabets and read in C two or more parallel messages which may be related to each other or not at all.

Parallel encryption can be used in various applications and descriptions.

3.5.2 Rock Encryption

In Encryption mode the Rock operator (the transmitter) converts to ciphertext C=C(M), a plaintext message M comprising t letters $x_1, x_2, \ldots x_t$ where $x_i \in P$, where P is the applicable plaintext message comprising n letters $p_1, p_2, \ldots p_n$.

The conversion proceeds as follows: M is divided to arbitrary consecutive parts $M_1, M_2, \ldots M_q$. The size of each part is determined randomly as a choice between two arbitrary limits $M_{min}$ and $M_{max}$, until the last part which is the residue.

Each M part is converted independently and successively to the corresponding ciphertext part. $M_i \rightarrow C_i$.

The Rock idea for encryption is to identify an 'anchor' bin, A, on the key, building the key sequence with A as $k_1$=A, (Key-List(A)). Taking S steps on Key-List(A) to land on a bin that contains the letter to be encrypted. The values of A and S are highly randomized and dependent on parameters of the Rock (the key). The randomization of A and S prevent a cryptanalyst from detecting patterns. Limiting cryptanalysis to brute force.

In one particular embodiment the bin that contains the current letter serves as the anchor for the next letter. All the letters of a randomized size message part are set up in such sequence where a target bin B, serves as anchor to the next target bin (where the next letter is to be found).

The data used to identify the anchors and the steps from each anchor to the next bin (containing the target letter) is together the ciphertext for the so encrypted message. The list that develops from applying the ciphertext is regarded as the expanded plaintext because it contains the original plaintext M ($x_1, x_2, \ldots x_t$) but it also contains in between any number of decoy bins and signal bins.

The fundamental mathematical construct for the encryption process is the subjective sequence of the k bins in the key (K), as determined by selecting a first bin in that sequence ($k_1$). That sequence is a self-wrapping "snail" over the scaffolding into which the key is built. The formal description of this snail sequence is defined in the enclosed flow chart. The informal description is as follows. Mark the starting bin as $k_1$ and start the subjective key list with this bin. Move one step on the grid in a given dimension. If the arrived bin is not empty and is not already on the list, then mark it as $k_2$. Now switch to the next dimension and move one step—to the next bin in that direction. If that bin is not empty and is not already on the list then mark it as the next bin, now $k_3$. If that bin is already on the list then return the recent step and take another step in the dimension that pointed to the bin already on the list. If the newly arrived bin is not empty and not on the list then mark it as next on the key list. If it is on the list already, or empty, then repeat as before: return the last step and move another step in the same direction that led to a previously listed bin or to an empty bin. Then switch to the next dimension and do the same. When all dimensions have been traversed then return to the first dimension and take a step on that dimension but in the opposite direction to the direction taken before. Continue with the same sequence flipping the direction of the steps for each dimension (from the direction used for this dimension in the previous time it was involved). This "snail like" sequence will continue through the grid (the scaffolding) indefinitely. At some point all the bins of the key will be listed on the accumulated Key-List and thereby define the subjective key sequence that is projecting from the bin that was designated as the first in the sequence ($k_1$). There are k such key sequences, because any bin on the key can serve as the first in the sequence and hence all k sequences are different.

It is noteworthy that all steps that result in arriving at an empty bin, don't increment the list count. Therefore the list depends heavily on the distribution of empty bins throughout the key. And for that reason an attacker without knowledge of the structure of the key will not be able to list the sequence even if they know the anchor bin ($k_1$). This distinction between knowledge of the key structure and not having that knowledge can be used by directing the key holder to go to bin at sequence count i (S steps from the anchor) on the subjective list from a given anchor bin. The measure of S can be determined by the subjective sequence of the anchor and by the identity of the bin of the anchor.

For example let a given bin of address (x,y) on the grid contain letter $p_3$. Let the next letter of the plaintext message M be $p_7$ on the P alphabet. One wishes to determine S moves such that they will lead to a bin with a content of $p_7$. Let the key contain $r_7$ instances of letter $p_7$. Each of those bins is somewhere on the key sequence Key-List(x,y). Therefore one could use a randomizer to choose which instant to select (with the proper number of steps to be taken from the anchor to the selected bins).

The key sequences are defined in a repeat or circular manner. Once bin k is reached, then the counting repeats with $k_1, k_2, \ldots$ etc. Say then: bin (k+1) on the sequence is the first bin. Bin (k+2) is the second bin, etc, namely:

$$k_{k+1} = k_i$$

or more generally:

$$k_{\theta k+1} = k_t$$

where θ is any positive integer.

One could add to the calculus of the next bin the knowledge of the content of the anchor bin, not just its address. One would use a randomizer to choose a random positive integer g, and go over the key-List(x,y) to find $k_j$ which is the address of a bin that contains the same content as the anchor but which appeared g times on that sequence. There is always such a bin because the counting is cyclical. Then one moves along that sequence step by step (bin by bin) to reach a bin k, that contains the target letter (the next letter in the message part of M). Accordingly the instructions how to go from the anchor of $k_1$ on Key-List(x,y) to a bin containing the identity of the next letter on the M part will be: from the anchor identify $k_j$ as the bin that contains the g—count occurrence of the letter content of the anchor, and from $k_j$, on the same sequence make (l–j) steps to arrive at the bin, the identity of which is the target letter (the identity of the next plaintext letter on the plaintext message, or a decoy, or a signal).

So it goes until the last letter in the M sequence. Then the signal letter is added to the sequence to indicate that this M-part is done being encrypted. The set of instructions for finding the next bin where the next letter is marked, as applied to the entire plaintext message section is the ciphertext for the that section. This ciphertext is passed to the intended recipient who is using these instructions with the possession of the key to figure out all the letters of P. Originally the recipient will be extracting from the ciphertext the extended plaintext, and then the recipient will reduce it to the original plaintext by removing the signal letters and the decoy letters.

The selection of g and the S counts to the intended bin may be done with modular arithmetic camouflage. The indicated value of (l-j) as above is smaller then k: $(l-j)<k$. It can nonetheless be transmitted as $\theta k+(l-k)$, where $\theta$ is an arbitrary positive integer. This will better hide the value of k before the attacker. The encryption of any message part (segment) is based on an arbitrary selection (randomized) pre-anchor bin (x,y), then defining the first anchor for the first letter in the message by count of steps following the g-times appearance of the letter that occupies bin (x,y) and similarly for some bin $k_i$ i=1,2, . . . in the Key-List(x,y) sequence.

The use of signals: Signal letters may signal the beginning of a new message part, the end of the current message part and the beginning and end of a whole communication session. This can be done with one signal letter appearing one, two or three times in a row. So the decrypted sequence for three message parts in sequence will look like:

$s_1$-$s_1$-[P letters]-$d_1$-[P letters]-$s_1$-[P letters]-$d_1$-$d_1$-$d_1$-[P letters]-$s_1$-[P letters]-$d_1$-[P letters]-$s_1$-$s_1$ Where $d_1$ is a decoy letter and $s_1$ is a signal letter. Alternatively several distinct signal letters may be used.

3.5.3 Rock Decryption

The intended recipient of the ciphertext pack, $C_i$, for a message segment, $M_i$, will use the Rock (the key) to identify the bins that contain the right sequence of plaintext language P letters, thereby reconstructing the plaintext.

The full message M is constructed from h consecutive parts: $M_1, M_2, \ldots M_h$. The intended recipient (the decryptor) will reconstruct M by concatenating the decrypted sequences for each of the h message parts.

A fundamental element of this cipher is the large degree of randomization that is used by the encryption process. These are randomized decisions that are not pre shared with the recipient. Yet, the recipient will properly handle this large variance to extract the encrypted plaintext.

The randomized encryption breaks any pattern that otherwise would have emerged—and eventually discovered—in the plaintext-ciphertext exchange.

4.0 Mathematical Elements of this Invention

We consider the following mathematical elements used in this equations. They are either novel, per se, or their application herein is novel: (i) the Snail, (ii) the virtual neighbor, (iii) randomized category, (iv) upgraded Replica procedure.

4.1 The "Snail"

We focus this discussion on the two dimensional case, for simplicity of the presentation. It can be readily extended to higher dimensionality.

Given a finite two dimensional 2D array, comprising $t^{1/2}*t^{1/2}=t$ elements, it can be sequenced in t! ways (permutations). And it is possible to fix the reading on the y axis and run the x from the first element to the last, then do the same for the 2nd y value. However, an indefinite array needs a different method to sequence its elements. The snail method is one effective choice. In the described snail sequence, one wraps around a starting element, snail like, with wider and wider lines progressing around the starting element, missing no element on the way, and continue indefinitely for however large the array. (See FIG. 2)

This invention deploys the snail sequence over the 2D grid, starting from any arbitrary bin (array element). Then using this so-called snail sequence to apply randomization determination of type for each element of the grid. One type called 'empty' means that this element—or alternatively called bin—is not part of the key. Say then that if k* bins have been snail-sequenced from some arbitrary starting bin, then k≤k* bins are assigned to become a key comprising k non-empty bins, mixed with $e_k$=k*-k empty bins. Since each empty state like all states is randomized, it turns out that even knowing the starting bin does not reveal information about how the k bins of the key are count-marked.

4.2 The Virtual Neighbor

The virtual neighbor is a mathematical construct that ensures indistinguishability between bins that are deep inside the key, surrounded by non empty bins, and bins that are on the surface of the key, or border with a 'hole' in the key. Every direction of an edge from a subject bin that points to an empty bin, is transformed to point to the furthest non-empty bin at the opposite direction of the edge. There is always a 'furthest bin', although it may be the subject bin itself. The use of the virtual bin makes all bins look the same in as much as they all have the same number of edges. Furthermore, it tosses the pathway around unexpectedly from one side of the key to the opposite side.

4.3 Randomized Category

This invention uses an assignment algorithm to randomly assign $n_i$ items of type i, for i=1,2, . . . t to N bins where N=$\Sigma$ $n_i$ for i=1,2, . . . t. The algorithm assigns the first bin through a randomization process modified by the t $n_i$ values. But once the first bin is assigned to item j, then the randomization proceeds as modified by $n_j$-1, with all the other modifiers ($n_i$ for i≠j) stay the same. Similarly every assigned bin decrements the 'yet to be assigned' count for its item type. This guarantees a perfectly randomized assignment of the t item types. This algorithm is used to build the key totally pattern devoid.

4.4 Modular Replica Procedures

Redefining the Replica procedure as follows. Given an alphabet A comprising n letters $a_1, a_2, \ldots a_n$, let T (Template) be a string of t letters from A, and let F (Feed) be another string made of f letters from A. Let us a define a Replica-count procedure in which one counts from the first letter of T through all the t letters. In parallel one counts up the F string from $f_1$ (the first letter in F) to the next. The counts are coordinated. When the T count is at letter $t_1$, the F count proceeds from $f_1$ upward until one encounters some $f_i$=$t_1$, and then the two counts stop. If no such F letter is found then F is said to be a residual replica of string T. The T count continues from $t_j$ upwards for j=1,2, . . . t, while the count on F continues until some letter $f_k$ is found where $f_k$=$t_{j+1}$ and then while the count on T goes to $t_{j+2}$, the count on F proceeds from $f_{k+1}, f_{k+2}, \ldots$ Where $f_{k+1}$=$t_{j+2}$ and $f_{k+2}$=$t_{j+3}$ So while the count on T is letter by letter, the corresponding count on F is any number of letters until the right letter is found.

If F is finished before the T count is done then, F is said to be a residual replica of string T.

If the count of T is finished, (comes to the last letter in the template T) the count then continues from the beginning, again and again until the count of F reaches the end of F (letter $f_f$). This happens when the last counted letter on T is $t_j$. At this point some letter on F, letter $f_f$, was the last one that was F counted, namely $f_f$ =$t_j$) then the string $F_r$=$f_{m+1}f_{m+2}$- . . . $f_f$ is regarded as a residual replica of T; where $f_m$ is the letter on F that was counted to fit to letter $t_j$ on T, namely $t_j$=$f_m$. For m=f the residual is regarded as null, or zero. We write:

F=$F_r$ REP T where $F_r$ is the residual of F Replica T.

Illustration. Let the subject alphabet A={X,Y,Z,W}, let T=XXZ, let F=XYYXWWYZXY. We count 1 on T: $t_1$=X, and $f_1$=X, so we count up $t_2$=X; on F we count to $f_4$=X. We keep counting on T: $t_3$=Z. On F we need to count to $f_8$=Z. Counting concluded, with F having two letters left uncounted: $f_9$-$f_{10}$='XY'. We say that XY is the replica residue of F over T:

XYYXWWYZXY=XY REP XXZ

Let designate $F_T$ as a feed string such that $F_T$=0 Rep T. We can write:

F=$F_T$∥'XY'=$F_T$+'XY'

We use the '+' sign to indicate concatenation. Clearly if $F'_T \neq F_T$ is another feed string with a zero residue, then for F'=$F_T$+'XY' we can write:

F'=($F'_T$+'XY') REP XXZ='XY' FREP XXZ and also, let G=a*F be the string F repeated a times:
  G=F+F+ . . . F a times, then clearly:
H=α$F_T$+b$F_T$=0 REP XXZ ENCIPHERMENT: Let a plaintext language B be comprised of m letters $b_1$, $b_2$, . . . $b_m$. Let m template strings $T_1$, $T_2$, . . . $T_m$ be associated each with the corresponding letters in language B. These m template strings may be considered a secret shared key. A transmitter will communicate to a recipient sharing the key, letter $b_i$ by sending to them a feed string $F_i$ such that:

$F_i$=0 REP $T_i$ and $F_i \neq$0 REP $T_j$ for j≠i

There are infinite ways for the transmitter to convey any letter of B to the recipient, and the communicated feeds may be of indefinite size. "And also an easy opportunity to send out decoy letters—feed strings that don't comply with the terms in the above equation.

Illustration: Let the plaintext language B be comprised of three letters A, B, C. Let language A be comprised of 4 letters {X, Y, Z, W}. The key for the Replica cipher is comprised of three templates, one for each of the B letters:

$T_A$='YZXYWXX'
$T_B$='WWZX'
$T_C$='ZYXWZY'

The transmitter wishes to send letter A to the recipient. He then take $T_A$ and builds a feed for it by randomizing:

$F_A$=YWWZYXZZYXXWZYWXXZYZWYWXYYWW

Processing $F_A$ over $T_A$: Marking the pointer jumping over the feed string with square brackets:

$F^*_A$=Y[WW]Z[Y]X[ZZ]Y[XX]W[ZYW]XX+ZYZWYWKYYWW

We can write:

$F^*_A$=YWWZY        XZZYXXWZYWXX+ZYZWYWXYYWW=$F_A$+ZYZWYWXYYWW=REP 'YZXYWXX' or say:

$F_A$=YWWZY XZZYX XWZYWXX=0 REP $A_A$

Now we need to check how $F_A$ features with the other letters B and C:

$F_A$=[Y]WWZ[Y]X+ZZYXXWZYWXX=ZZYXXWZYWXX    REP 'WQZX'≠0 RCE P $T_B$ $F_A$=[YWW]ZYX[ZZYXX]WZY+WXX=WXXR    REP 'ZYXWZY'≠0 REP $T_C$

So $F_A$ points to $T_A$ ($F_A$=0 REP $T_A$) without confusion, since: $F_A \neq$0 REP $T_B$ and $F_A \neq$0 REP $T_C$ The transmitter could build, say two more feed strings that are 0 REP $T_A$:

$F'_A$=YWWZYWXWWWYXXXWWYXZZK=0 REP $T_A$
$F''_A$=YXXXZWWWWVXZZYXWZZZXYYX=0 REP $T_A$ and combine them $F^{**}_A$=$F_A$+$F'_A$+$F''_A$=0 REP $T_A$ Where:
$F^{}_A$=YWWZYXZZYXXWZYWXX+YWWZYWXWWWYXXXWYXZZX+YXXXZWWWWXZZYXWZZXYYX Will equally point to $T_A$, and would qualify as a ciphertext for letter A, if $F^{}_A \neq$0 $T_B$ and $F^{**}_A \neq$0 REP $T_C$ 4.5 "Add One" Leftmost (AOL) Bijection Integers and Bitstrings Let S be a bit string. Let us attach '1' leftmost to S to construct S*='1'∥S. Let s+1 be the natural number expressed by S* when interpreted in strict binary $\Sigma$ [bit-i]$2^i$ for i=0,1, 2 . . . Given s, one readily writes out S*, then chops off the leftmost '1' to extract S. So S←→S.

| Here is how it starts: | | |
|---|---|---|
| S | S* | s |
| ' | 1 | 0 |
| 0 | 10 | 1 |
| 1 | 11 | 2 |
| 00 | 100 | 3 |
| 01 | 101 | 4 |
| 10 | 110 | 5 |
| 11 | 111 | 6 |
| 000 | 1000 | 7 |
| 001 | 1001 | 8 |
| 010 | 1010 | 9 |
| 011 | 1011 | 10 |

This will allow us to match any bit string to a unique natural number and vice versa. It also facilitates bit string arithmetic:

3+5=8→'00'+'10'='1001'

6+1=7→'11'+'0'='000'

SQRT(4)=2→SQRT('01')='1'

This arithmetic allows cipher users to exchange bit strings (ciphertexts) very efficiently.

5.0 Applications

We discuss: Ad-Hoc Photographic Rock Communication, AI Activated Elusive Key Rock, Network Security Applications 5.1 Rock Embodiment The Elusive Key Rock may be constructed in hardware, or set up in software. The advantage of the former is it being embodied outside the digital realm, immunized to hacking attempts. Hardware embodiments are not vulnerable to big electromagnetic shock as digital devices are. So in applications where the Rock key is designed to be used as the cornerstone from which to rebuild a disrupted network, a hardware embodiment looks attractive.

Software embodiments may be digital or colorful, in which the color of the content of the bin reflects the assigned letter. Such photographic Rocks will be very handy for ad hoc Rock communication, Software Embodiments of the Elusive Key Rock: Setting an example: using a plaintext language with n=8 letters. Each letter will be written with 3 bits. So every combination of two letters defines a Base64 letter. Then adding a 4th bit to allow for 8 more items for decoys and signal options.

5.1.1 Ad-Hoc Photographic Rock Communication

The Elusive key Rock may be constructed over a pixelated screen shown on one's phone, and being photographed by the camera of another phone, or similar device, thereby two strangers sharing a physical proximity exchange an Elusive key to establish secure communication. Once shared, these strangers may be set apart, and maintain their secure communication which unlike the normal way is not reliant on an application operator to provide key and security.

A normal computer photographic color has 24 color options. So it is safe to use a plaintext language P with n=8 letters. P can be carried via 3 bits size letters. By using a 4th bit string there is plenty of room for decoy colors and signal color, and perhaps a white color for 'empty' status.

5.2 AI Activated Elusive Key Rock

Both the key construction and the encryption process are carried out via a series of randomized decisions designed to wipe out any remnants of a pattern to be exploited by a cryptanalyst. These randomization processes take place between a low limit and a high limit for a randomization choice. These limits reflect security considerations, and as such they can be given to an artificial intelligence (AI) machinery to be controlled by. The AI compendium will be analyzing risk parameters and evaluate the degree of security needed to face such risk. This evaluation will translate into setting high and low limit for a randomized value selection. Also, as discussed before, AI can be used to come forth with creative ways to convey anchor and steps count to the recipient.

5.3 Network Security Applications

Practically all networks today operate on the basis of the prevailing ciphers which are based on mathematical complexity, and hence are vulnerable to a mathematical shortcut that was discovered by the attacker, not by the defender. These networks engage a large number of users through complexity of protocols. The amount of traffic and engagement is such that statistically errors do happen, exposing cryptographic keys that lead to a serious onslaught on the network as a whole. Such occurrences need to be prepared for. The idea is to put together a recovery plan to climb back from a surprise breach. For this recovery plan to work, it must rely on information that was not at risk and was not compromised along with the breach. This calls for security to be projected in a different way compared to the normal network operation. Since nominal network operation is based on ciphers that may have been stealthily compromised, a new cipher methodology is called for. The Rock— the Elusive Key—is exactly such a new methodology. The network will keep the Rock unused, or with limited use only, so that if needed it can be used as a recovery tool processing information content that is less than the entroy packed in the key, and thereby enjoy mathematical guarantee of integrity. Hubs of a compromised network, will start their recovery process by unleashing the Rock, and building foundation exchange from where to rebuild the entire network, using back files etc. The Rock may be hybrid—part hardware, part software. The hardware—the material part—will be safely locked, ready for the emergency it is designed for. The Rock will keep serving even after it loses the perfect mathematical secrecy status because it loses its security very slowly, and it is never totally lost because one can never be sure that an apparently working key is the real key.

What is claimed is:

1. A method of encryption, the "Elusive Key" cipher, wherein a cryptographic key is upgraded into a secret size, secret geometry, secret content mathematical construct regarded as the "Elusive Key" or the "Rock", and where randomized parts of the Elusive Key or the Rock are used for each instant of encryption, comprising:

by a computing device:
(i) the Elusive Key or the Rock is constructed by populating k locations of a physical device implementation or a computer memory implementation of the Elusive Key (Rock), called "bins", of an N-dimensional array, with letters of a plaintext alphabet, P, comprising n letters $p_1, p_2, \ldots p_n$, indicating the bins each contains a letter from P, or are marked by a letter from P, and where each bin has $e=3^N-1$ connections, called 'edges' to e neighboring bins:

(ii) utilizing "Walk" encryption, the edges are each marked with letters of a ciphertext alphabet C, comprising m letters $c_1, c_2, \ldots c_m$, where m≥e and no two edges emanating from the same bin are marked by the same ciphertext letter;

(iii) Walk encryption further uses a plaintext message M, comprising t plaintext letters $m_1, m_2, \ldots m_t$ by order as a "travel guide" along the Rock, by randomly selecting a starting bin for the travel, an anchor bin, then using M to mark a bin to bin travel path, $T_p$, on the Rock (the Elusive Key), then expressing the resulting travel path, $T_p$, by specifying the location of the anchor bin, A, on the Rock, and listing the edges that comprise the travel path, $T_c$, with a transmitter passing to a recipient the address of the anchor, A, and $T_c$;

(iv) "Walk" decryption is implemented by the recipient sharing the Rock, by using $T_c$ and A to mark the travel path on the Rock, then reading the sequence of bins that comprise the travel path, thereby listing $T_p$=M;

(v) Rock encryption is implemented by using a key sequencing procedure called "Snail" which lists all the k bins of the key, the Rock, by a certain order, creating a "Snail Curve" and where this order can start with an arbitrary bin of the key (marked as bin 1) and where this order refers to any of the k bins as bin-i, for i=1, 2, ... k, and where every bin listed at position i (1≤i≤k) has an edge pointing at bin-(i+1), with the transmitter randomly selecting anchor, $A_j$, then counting $s_j$ steps on the Snail curve for which bin-1=$A_j$; where these $s_1$ steps lead to a bin containing plaintext letter $m_j \in P$, where $m_j$ is the j-th letter in M, so doing for j=1,2, ... t;

with the transmitter passing to the recipient the t anchors $A_1, A_2, \ldots A_t$, and t step counts $s_1, s_2, \ldots s_t$; and (vi) Rock decryption is implemented by the Rock-sharing recipient, marking $A_j$ on the Rock, building the Snail curve with $A_j$ as bin-1, then counting $s_j$ steps on the Snail curve to land at a bin that contains plaintext letter $m_j$, which is the j-th letter in M, so doing for j=1, 2, ... t, then stringing letters $m_j$ by order j=1,2, ... t to build M.

2. The method of claim 1, further comprising:
a surface bin, b, for which at least one certain edge does not point to any neighboring bin, another bin of the key is regarded as the pointed-to neighboring bin, b*, instead of the missing neighbor; the pointed-to "virtual neighbor" bin, b* is being determined by identifying the bin most distant from b, when measured in the direction opposite to the direction of the edge that pointed to no neighboring edge, thereby for every bin in the key there are e edges pointing to e neighboring bins, and further utilizing Walk encryption, the move from b to b* is regarded as a step in the travel path, with that step marked with the ciphertext letter of the edge pointing to a missing bin.

3. The method of claim 1, further comprising:
the elements of the N dimensional array are listed as N count tuple $(x_1, x_2, \ldots x_N)$ where $x_i$ for i=1,2, ... N is listed in a cartesian way, and where the transmitter identifies the anchor by indicating to the recipient a bin identified with its N count tuple, which is regarded as the pre-anchor, and from where the anchor is defined as steps on the Snail sequence based on the pre-anchor where the number of steps is specified on the basis of the contents of the bins along the Snail sequence.

4. The method of claim 1, further comprising:

further utilizing "Walk" encryption wherein plaintext letters $p_1, p_2, \ldots p_{n-1}$ are put in sequence, M*, to represent any string of bits, and letter Pp is interjected into M* to break any letter repetition, namely any occurrence of $p_i$–$p_i$ in M* is turned into $p_i$–$p_n$–$p_i$, for i=1,2, . . . (n–1), thereby M* turns to M which is free of any letter repetition;

the transmitter of M will then transform M to M' by creating at will a number of repetitions of any letter in M, and use M' as the travel guide, with the recipient exercising the decryption procedure extracting M' and recovering M from it by eliminating all the letter repetitions, and then removing $p_n$ from M to recover M*.

5. The method of claim 4, further comprising:

wherein the Elusive Key is compliant with a "travel continuity requirement" which states: every letter zone has at least one edge to each of the other plaintext letters, and where a 'letter zone' is defined as one or more bins, a "bundle", marked with the same letter so from every bin in the bundle it is possible to step to any other bin in the bundle without exiting the bundle, indicating every bin in the letter zone is regarded as compliant.

6. The method of claim 5, further comprising:

where one applies a travel requirement compliance over a randomized Elusive Key by:

(i) testing arbitrary bins until finding a bin that is compliant with the travel continuity requirement, and if none is found that is compliant with the travel continuity requirement then re-randomizing the key;

(ii) defining a Snail sequence over the key starting with the compliant bin in (i);

(iii) checking the bins in the Key in the sequence defined by the Snail curve, and where any bin that is not compliant with the travel continuity requirement gets its content changed to the letter content of the bin before it in the Snail sequence; and after all the bins in the Snail sequence are checked, restart another round of checking long as in the last round of checking some bins underwent change of content.

7. The method of claim 1, further comprising:

where a message M is divided to arbitrary consecutive segments $M_1, M_2, \ldots M_h$, and each segment i (i=1, 2, . . . h) uses anchor $A_{i1}$ for its first letter $m_{i1}$, and where the bin that contains letter $m_{ij}$ serves as the anchor for letter $m_{i(j+1)}$, where $m_{ij}$ is letter j in segment i, and where $A_{i1}$ is determined based on a pre-anchor bin, from which by the count of $S_0$ steps to be made from the pre-anchor to $A_{i1}$ on the Snail sequence one arrives at $A_{i1}$, and where the count $S_0$ is identified by the transmitter to the recipient by an algorithm that computes $S_0$ based on the contents of the bins in the Snail sequence based on the pre-anchor.

8. The method of claim 1, further comprising:

wherein the Snail sequence over a two-dimensional key further comprises:

starting with an arbitrary array identified by row address, x, and column address, y, (x,y), and starting with an empty Snail list, list(x,y) one sets bin-1 in List(x,y)–(x,y); and choosing an arbitrary number k of bins to be listed in the Snail sequence, then one sets i=x, j=y, and continues by:

(a) set i=i+1, check bin (i,j), if it already listed in List(x,y) then set i=i–1, and j=j–1, return to (a);

if bin (i j) is not in List(x,y) then add it: List(x,y)=List(x,y)+(i j);

if List(x,y) includes k bins, terminate the Snail sequence, otherwise:

(b) set j=j+1, check bin (i j), if it already listed in List(x,y) then set i=i+1, and j=j–1, return to (b);

if bin (i j) is not in List(x,y) then add it: List(x,y)=List(x,y)+(i,j);

if List(x,y) includes k bins, terminate the Snail sequence, otherwise:

(c) set i=i–1, check bin (i j), if it already listed in List(x,y) then set i=i+1, and j=j+1, return to (c);

if bin (i j) is not in List(x,y) then add it: List(x,y)=List(x,y)+(i,j);

if List(x,y) includes k bins, terminate the Snail sequence, otherwise:

(d) set j=j–1, check bin (i j), if it already listed in List(x,y) then set i=i–1, and j=j+1, return to (d);

if bin (i j) is not in List(x,y) then add it: List(x,y)=List(x,y)+(i,j);

if List(x,y) includes k bins, terminate the Snail sequence, otherwise go to (a).

9. The method of claim 1, further comprising:

where the Elusive Key (Rock) is built for Walk encryption by:

(a) utilizing an arbitrary Snail sequence of the planned k bins with each bin non-empty, marked by one letter out of the n letters of the plaintext language P, and arbitrarily selecting the number e of 'empty bins' to be mixed with the non-empty bins of the key, one is using a randomness source for each bin in the Snail sequence to decide for each bin whether it would be empty or non-empty, by running the randomness source so that the chance for each bin to be non-empty will be (k–i)/(k–i+e–j), and the chance for each bin to be empty will be (e–j)/(k–i+e–j), where i is the number of bins already selected to be non-empty and j is the number of bins already selected to be empty, continuing with this randomization process for i=0,1, . . . k and j=0,1,2 . . . e; and (b) using a randomness source to assign a plaintext letter to each bin that was selected to be non-empty by:

(b).1 for each of the n letters of plaintext P selecting an arbitrary number of occurrences in the key: $q_1, q_2, \ldots q_n$ such that $q_1+q_2+ \ldots +q_n=k$, (b).2 for each non-empty bin by order use the randomness source so that the chance for each current bin to be assigned letter $p_i$ will be: $Pr_i=(q_i-g_i)/(k-h)$ where $g_i$ is the number of bins that were assigned to be marked by letter p i, and h is the total number of bins that were assigned a letter before the current bin.

10. The method of claim 1, further comprising:

where the Elusive Key (Rock) is built by:

(a) using an arbitrary Snail sequence of the planned k bins with each bin marked by one letter out of the n letters of the plaintext language P, to be letter-marked, then arbitrarily selecting the number e of 'empty bins' to be mixed with the non-empty bins of the key, then arbitrarily selecting the number d of bins to be marked as 'decoy' bins, bins that don't contain any letter of P and are not empty bins; then arbitrarily selecting the number s of bins to be marked as 'signal' bins, bins that don't contain any letter of P, are not 'decoy', and are not empty bins, utilizing a randomness source for each bin in the Snail sequence to decide for each bin whether it will be empty, decoy, signal or letter-marked, by running the randomness source so that the chance for each bin to be letter marked will be $(k-i)/(k-i+e-j+d-l+s-r)$, the chance for each bin to be empty will be $(e-j)/(k-i+e-j+d-l+s-r)$, the chance for each bin to be decoy will be $(d-k)/)/(k-i+e-j+d-l+s-r)$, and the chance for each bin to be 'signal' will be $(s-r)/)/(k-i+e-j+d-l+s-r)$, where i is the number of bins already selected to be letter-marked, j is the number of bins already selected to be empty, l is the number of bins already selected to be decoy, and r is the number of bins already selected to be signal, continuing with this randomization process for $i=0, 1, \ldots k$, $j=0, 1, 2 \ldots e$, $l=0, 1, \ldots d$, $r=0, 1, 2, \ldots s$; and (b) utilizing a randomness source to assign a plaintext letter to each bin that was selected to be non-empty by:

(b).1 for each of the n letters of plaintext P selecting an arbitrary number of occurrences in the key: $q_1, q_2, \ldots q_n$ such that $q_1+q_2+\ldots+q_n=k$, (b).2 for each non-empty bin by order use the randomness source so that the chance for each current bin to be assigned letter $p_j$ will be: $Pr_j=(q_i-g_i)/(k-h)$ where $g_i$ is the number of bins that were assigned to be marked by letter $p_i$, and h is the total number of bins that were assigned a letter before the current bin.

11. A physical device implementation of an Elusive Key (Rock) comprising:

a two-dimensional array where each element of the (x,y) array is either empty, or non-empty, and where non-empty bins contain a material ingredient $r_i$ from a selection of f ingredients $r_1, r_2, \ldots r_f$, where each of the f ingredients is characterized by a unique measurable electric conductivity, and where each bin is fitted with electrical probes connected to electrical circuitry that will measure the conductivity of a bin's content and thereby identify which ingredient out of the f possibilities it contains, and where at least each of the n of these material ingredients are associated with exactly one letter of the plaintext alphabet P, so all the n letters of P are each associated with at least one of the f material ingredients, and where some of the f materials are associated with non-letter, non-empty bins (decoy bins).

12. A physical device implementation of an Elusive Key (Rock) comprising:

a two-dimensional array where each element of the (x,y) array is either empty, or non-empty, and where non-empty bins contain a material ingredient $r_i$ from a selection of f ingredients $r_1, r_2, \ldots r_f$, where each of the f ingredients is characterized by a reflecting color, or a different electromagnetic radiation which is uniquely measurable, and where each bin is being viewed by appropriate sensors fitted with electrical probes connected to electrical circuitry that measures the radiation of a bin's content and thereby identifies which ingredient out of the f possibilities it contains, and where at least each of the n of these material ingredients are associated with exactly one letter of the plaintext alphabet P, so all the n letters of P are each associated with at least one of the f material ingredients, and where some of the f materials are associated with non-letter, non-empty bins (decoy bins).

13. The physical device implementation of the Elusive Key (Rock) of claim 12, further comprising:

where the bins of the Elusive Key are characterized by different visible colors, marked on rectangles drawn on a screen of a first computing device, representing key bins, and where the key is displayed so that a camera of a second computing device will photograph the key as displayed on the screen of the first computing device and thereby the second computing device gets possession of the Elusive Key.

* * * * *